(12) United States Patent
Tengler et al.

(10) Patent No.: US 8,779,947 B2
(45) Date of Patent: Jul. 15, 2014

(54) VEHICLE-RELATED MESSAGING METHODS AND SYSTEMS

(75) Inventors: Steven C. Tengler, Grosse Pointe Park, MI (US); Mark S. Frye, Grosse Pointe Woods, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 127 days.

(21) Appl. No.: 13/439,920

(22) Filed: Apr. 5, 2012

(65) Prior Publication Data

US 2013/0265178 A1 Oct. 10, 2013

(51) Int. Cl.
*G08G 1/123* (2006.01)

(52) U.S. Cl.
USPC . 340/989; 340/539.13; 340/670; 340/870.02; 340/995.19; 307/10.7; 359/604; 455/404.1

(58) Field of Classification Search
USPC .......... 340/539.13, 670, 870.02, 995.19; 359/604; 307/10.7; 455/404.1
See application file for complete search history.

(56) References Cited

U.S. PATENT DOCUMENTS

| | | | |
|---|---|---|---|
| 5,877,897 A * | 3/1999 | Schofield et al. | 359/604 |
| 6,885,285 B2 | 4/2005 | Losey | |
| 2006/0033615 A1 * | 2/2006 | Nou | 340/539.13 |
| 2010/0131191 A1 * | 5/2010 | Ohki | 701/201 |
| 2010/0136944 A1 * | 6/2010 | Taylor et al. | 455/404.1 |
| 2011/0187547 A1 * | 8/2011 | Kweon | 340/670 |
| 2011/0260884 A1 * | 10/2011 | Yi et al. | 340/870.02 |
| 2013/0193753 A1 * | 8/2013 | Brey | 307/10.7 |

OTHER PUBLICATIONS

"The App That Makes Your Car . . . Smarter!", The Car Diva, 2011, 2 pgs., www.thecardiva.net.
U.S. Appl. No. 13/452,320, filed Apr. 20, 2012, Madanarajagopal, et al.

* cited by examiner

*Primary Examiner* — Daniel Wu
*Assistant Examiner* — Israel Daramola
(74) *Attorney, Agent, or Firm* — Dierker & Associates, P.C.

(57) ABSTRACT

Vehicle-related messaging methods and systems are disclosed herein. In one of the methods, a telematics unit disposed in a vehicle detects that the vehicle is no longer in operation. Upon making the detection, the telematics unit automatically transmits a message to a device, where the message includes a suggestion, a recommendation, an indication, or a notification pertaining to a vehicle utility. An application resident on the device, or on a cloud computing system in communication with the device, presents the message on the device by displaying i) the suggestion, the recommendation, the indication, or the notification and ii) a plurality of actionable items associated with the suggestion, the recommendation, the indication, or the notification.

19 Claims, 7 Drawing Sheets

VEHICLE-RELATED MESSAGING METHODS AND SYSTEMS

TECHNICAL FIELD

The present disclosure relates generally to vehicle-related messaging methods and systems.

BACKGROUND

Smartphones, tablet computers, and other similar mobile communications devices may be used, for example, to remotely control one or more vehicle-related functions. From outside the vehicle, various vehicle systems may be controlled by a mobile communications device, such as vehicle door locking/unlocking functions, vehicle window opening/closing functions, and radio presets to name a few.

SUMMARY

Vehicle-related messaging methods are disclosed herein. By one of these methods, a telematics unit operatively disposed in a vehicle detects that the vehicle is no longer in operation. Upon making the detection, the telematics unit automatically transmits a message to a device. The message includes a suggestion, a recommendation, an indication, or a notification pertaining to a vehicle utility. By an application resident on the device or on a cloud computing system in communication with the device, the message is presented on the device. The message is presented by displaying i) the suggestion, the recommendation, the indication, or the notification, and ii) at least one actionable item associated with the suggestion, the recommendation, the indication, or the notification. The application is executable by a processor of the device or of the cloud computing system, and includes computer readable code, embedded on a non-transitory, tangible computer readable medium.

Also disclosed herein are other examples of vehicle-related messaging methods, and examples of vehicle-related messaging systems.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
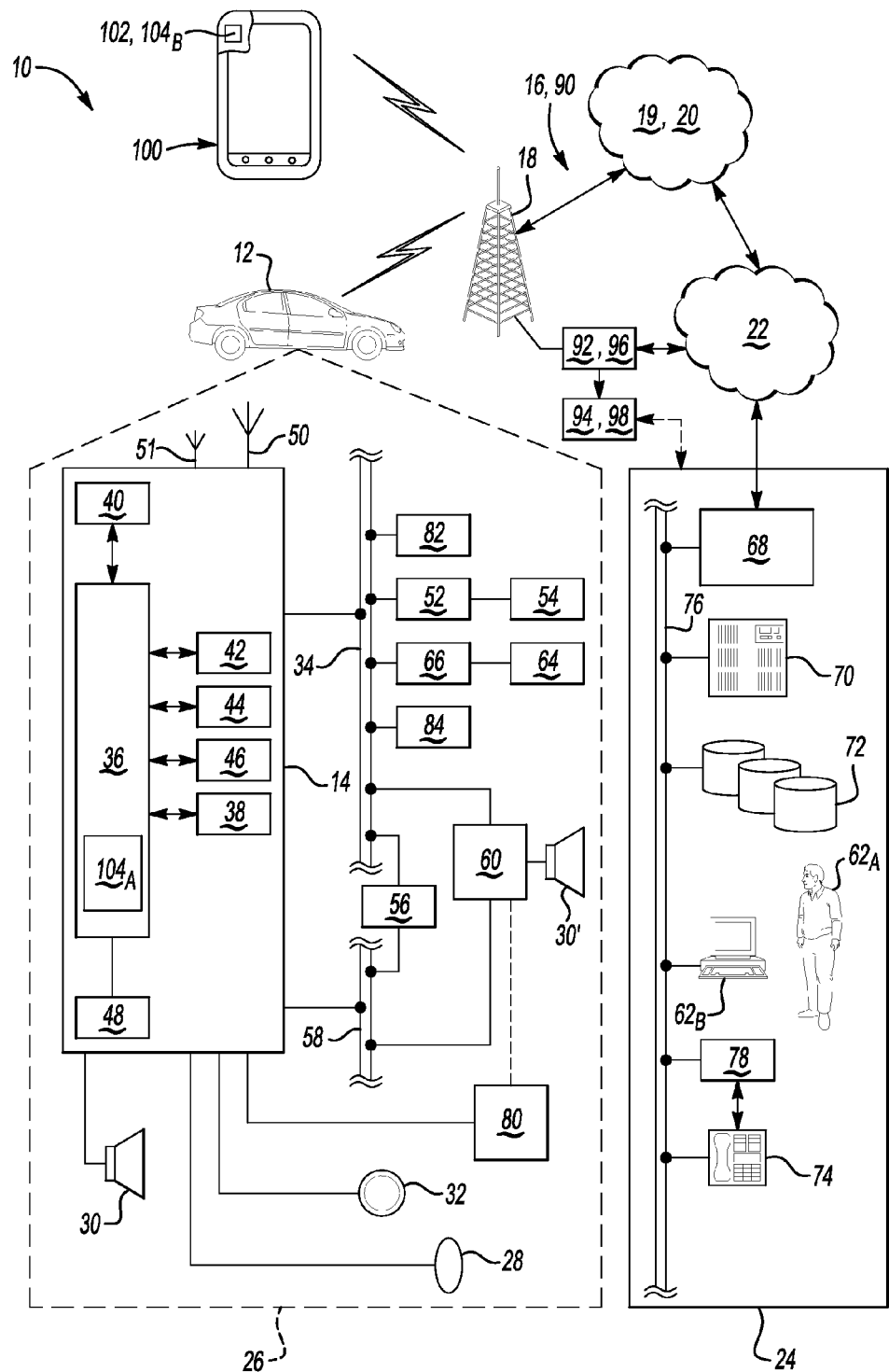
FIG. 1 is a schematic diagram depicting an example of a vehicle-related messaging system.

Examples of the methods and systems as disclosed herein may be used to provide, to a user, a suggestion, a recommendation, an indication, or a notification pertaining to a vehicle utility after the user has left his/her vehicle. The suggestion, recommendation, indication, or notification, along with at least one actionable item associated therewith, is included in a message that is sent to the user's mobile communications device from the vehicle. It is believed that the message may provide, to the user, pertinent information about his/her vehicle (such as a vehicle function or a vehicle condition) or about a personal item disposed inside his/her vehicle while the user is away from the vehicle. For instance, the user may be apprised of the fact that he/she did not lock the vehicle doors upon leaving, or that he/she left his/her gloves in the backseat of the vehicle. In some examples disclosed herein, upon receiving the message from the vehicle, the user can control one or more vehicle functions associated with, or in response to the suggestion, recommendation, indication, or notification. For instance, the user may control the vehicle door locking function upon receiving a notification that the vehicle doors are unlocked. Accordingly, the method enables the user to remotely control the vehicle utilizing learned information obtained from the vehicle.

It is further believed that the examples methods and systems may enable the vehicle to double check that the user intended to leave a particular vehicle function or condition in its then-current state, intended to leave a personal item behind, and/or the like. In this way, the methods and systems may also be used to protect the user's vehicle and/or personal items disposed inside the user's vehicle while the user is away from the vehicle.

As will be described in detail below, the suggestion, recommendation, indication, or notification pertains to a vehicle utility. The vehicle utility may be a vehicle function, a vehicle condition, or a personal item that is disposed inside the vehicle. As previously mentioned, the message includes at least one actionable item associated with the suggestion, recommendation, indication, or notification. The actionable item(s) is/are selectable by the user, and when selected, a reply may be sent back to the vehicle, e.g., with an instruction for the vehicle to perform a particular action. For instance, a message may be sent to the user's mobile communications device that includes a notification that the user left his/her briefcase on the passenger seat. The message may also contain an actionable item to ignore the notification, and another actionable item for the vehicle to perform an action, such as to check that all of the vehicle doors are locked. The user may select any of the actionable items using his/her mobile device. Upon making the selection, the user's mobile device automatically sends a reply message to the vehicle with an instruction pertaining to the selected actionable item; e.g., to check that all of the vehicle doors are locked if the user selected that particular actionable item. Further advantages and benefits will become evident in view of the detailed description of the examples of the methods and systems provided below.

As used herein, the term "vehicle user" or "user" refers to a vehicle owner or another person who is authorized to drive the vehicle owner's vehicle. In instances where the user is a telematics service subscriber, the term "user" may be used interchangeably with the term subscriber/service subscriber.

The user may also be a person who participates in online networking. In an example described herein, the user has his/her own personal webpage upon which information may be posted. The information may be a notification to others (e.g., friends of the user's online networking page) that the user has arrived at a particular location based, e.g., on then-current geographic location data of the user's vehicle.

It is to be understood that the phrase "inside the vehicle," as used herein, includes areas inside the passenger compartment of the vehicle, as well as inside the vehicle trunk. Areas inside the passenger compartment include any exposed passenger compartment areas such as on a seat, on the dashboard, on the center console, on the floor, etc. Areas inside the passenger compartment also include the inside of any storage compartments, such as a glove compartment, an over-head storage compartment, a center console storage compartment, a passenger door storage compartment, and/or the like. Areas inside the vehicle trunk may include the entire trunk area including the main storage compartment, side pockets, floor compartments, etc. It is to be understood that the phrase "inside the vehicle" may also be used interchangeably with the term "vehicle interior".

Additionally, the vehicle is "no longer in operation" when a mode of activity of the vehicle had just ended, and when a mode of inactivity of the vehicle has just begun. A further description of when the vehicle is said to no longer be in operation, along with various examples of detecting the same are described below.

Furthermore, the term "communication" is to be construed to include all forms of communication, including direct and indirect communication. Indirect communication may include communication between two components with additional component(s) located therebetween.

Still further, the terms "connect/connected/connection" and/or the like are broadly defined herein to encompass a variety of divergent connected arrangements and assembly techniques. These arrangements and techniques include (1) the direct connection or communication between one component and another component with no intervening components therebetween; and (2) the connection or communication of one component and another component with one or more components therebetween, provided that the one component being "connected to" the other component is somehow in operative communication with the other component (notwithstanding the presence of one or more additional components therebetween).

It is to be understood that the methods and systems disclosed herein may be utilized and/or applied at any time the electrical system of the vehicle is in an ON state even though the vehicle is no longer in operation. This is true even when the ignition system of the vehicle has been switched to an OFF state, and thus the vehicle engine is not actually running. It is further to be understood that when the vehicle ignition is switched into the OFF state, the vehicle electronics (e.g., the telematics unit) remains active (i.e., is in an ON state) at least for a preset period of time afterwards. In this way, the telematics unit can continue to communicate with various vehicle systems using, e.g., the vehicle information bus, even though the vehicle engine is not running. The telematics unit can also communicate with other communications devices, such as the user's mobile communications device.

While the vehicle ignition is in the OFF state and the electrical system of the vehicle is in an ON state, the telematics unit can detect/identify any vehicle utilities that may become the subject of a vehicle-related message for the user. If the telematics unit makes such a detection/identification, the telematics unit will remain active throughout the messaging method disclosed herein. If no such detection/identification is made by the telematics unit, then the telematics unit may enter a sleep mode until the telematics unit is subsequently woken up. In an example, the telematics unit may be woken up by the user, the call center, and/or another communications device, etc. when necessary.

It is to further be understood that the methods and systems of the present disclosure also utilize the user's mobile communications device. Details of the user's device will be described below at least in conjunction with FIGS. 1, 2, 5, 8 and 10.

An example of a vehicle-related messaging system 10 will now be described in conjunction with FIG. 1. The vehicle-related messaging system 10 generally includes a mobile vehicle 12, the telematics unit 14 operatively disposed in the vehicle 12, a carrier/communication system 16 (including one or more cell towers 18, one or more base stations 19 and/or mobile switching centers (MSCs) 20, and one or more service providers (e.g., 90) including mobile network operator(s)), one or more land networks 22, and one or more telematics service/call centers 24. In an example, the carrier/communication system 16 is a two-way radio frequency communication system, and may be configured with a web service supporting system-to-system communications (e.g., communications between the call center 24 and the service provider 90).

The carrier/communication system 16 also includes one or more host servers 92, 96 including suitable computer equipment (not shown) upon which information of a website resides/is stored. As disclosed herein, one of the websites may be a networking site with which a remotely accessible page 94 (e.g., a webpage) is associated, and another of the websites may be a service site and/or account managing site associated with the telematics call center 24 (described below). In an example, the remotely accessible page 94 is a networking page set up and maintained by the user, for example, and the webpage 94 is hosted by a social networking website. While, in this example, the webpage 94 is discussed as being a personal webpage of the user, it is to be understood that the webpage 94 may be run and owned by the entity operating the social networking website and is stored in the host server 92. It is further to be understood that the webpage 94 may also be run and owned by the user who operates his/her own social networking site, where such site is stored on a user-owned host server.

In an example, the host server 96 includes suitable computer equipment (not shown) upon which information of another remotely accessible page 98 resides/is stored. This remote accessible page 98 is a webpage set up and maintained by a network provider 90 or by a telematics service provider, and the user may access the page 98 by, e.g., submitting personal information (e.g., a login ID) and authenticating information (e.g., a password, a PIN, etc.). The computer equipment used to log into the page 98 may also include hardware, which, for example, can receive and read smart card for identification/authentication purposes, or can utilize biometrics for identification/authentication purposes.

The overall architecture, setup, and operation, as well as many of the individual components of the system 10 shown in FIG. 1 are generally known in the art. Thus, the following paragraphs provide a brief overview of one example of the system 10. It is to be understood, however, that additional components and/or other systems not shown here could employ the method disclosed herein.

Vehicle 12 may be a mobile vehicle, such as a motorcycle, car, truck, recreational vehicle (RV), boat, plane, or the like, and is equipped with suitable hardware and software that enables it to communicate (e.g., transmit and/or receive voice and data communications) over the carrier/communication system 16.

Some of the vehicle hardware 26 is shown generally in FIG. 1, including the telematics unit 14 and other components that are operatively connected to the telematics unit 14. Examples of other hardware 26 components include a microphone 28, speakers 30, 30', and buttons, knobs, switches, keyboards, and/or controls 32. Generally, these hardware 26 components enable a user to communicate with the telematics unit 14 and any other system 10 components in communication with the telematics unit 14. It is to be understood that the vehicle 12 may also include additional components suitable for use in, or in connection with, the telematics unit 14.

Operatively coupled to the telematics unit 14 is a network connection or vehicle bus 34. Examples of suitable network connections include a controller area network (CAN), a media oriented system transfer (MOST), a local interconnection network (LIN), an Ethernet, and other appropriate connections, such as those that conform with known ISO, SAE, and IEEE standards and specifications, to name a few. The vehicle bus 34 enables the vehicle 12 to send and receive signals from the telematics unit 14 to various units of equipment and systems both outside the vehicle 12 and within the vehicle 12 to perform various functions, such as unlocking a door, executing personal comfort settings, and/or the like.

The telematics unit 14 is an onboard vehicle dedicated communications device. In an example, the telematics unit 14 is linked to a telematics service center (e.g., a call center 24) via the carrier system 16, and is capable of calling and transmitting data to the call center 24. Via the carrier system 16, the telematics unit 14 is also capable of calling and transmitting data (e.g., a message) to other communications devices, such as the user's mobile communication device 100, 100' (see FIGS. 8 and 10), 100" (see FIG. 11).

The telematics unit 14 provides a variety of services, both individually and through its communication with the call center 24. The telematics unit 14 generally includes an electronic processing device 36 operatively coupled to one or more types of electronic memory 38, a cellular chipset/component 40, a wireless modem 42, a navigation unit containing a location detection (e.g., global positioning system (GPS)) chipset/component 44, a real-time clock (RTC) 46, a short-range wireless communication network 48 (e.g., a BLUETOOTH® unit), a dual antenna 50, and a short range wireless antenna 51. In one example, at least some of the telematics unit components (e.g., the wireless modem 42) include a computer program and/or set of software routines (i.e., computer readable instructions embedded on a non-transitory, tangible medium) executable by the processing device 36.

It is to be understood that the telematics unit 14 may be implemented without one or more of the above listed components (e.g., the real time clock 46), except in some examples disclosed herein, the telematics unit 14 includes the short range wireless network 48. It is to be further understood that telematics unit 14 may also include additional components and functionality as desired for a particular end use.

The electronic processing device 36 of the telematics unit 14 may be a micro controller, a controller, a microprocessor, a host processor, and/or a vehicle communications processor. In another example, electronic processing device 36 may be an application specific integrated circuit (ASIC). Alternatively, electronic processing device 36 may be a processor working in conjunction with a central processing unit (CPU) performing the function of a general-purpose processor. The electronic processing device 36 (also referred to herein as a processor) may, for example, include software programs or applications having computer readable code (also referred to herein as computer readable instructions) to initiate and/or perform various functions of the telematics unit 14. The processor 36 further includes an application $104_A$ that includes computer readable code (embedded on a non-transitory, tangible computer readable medium) for performing various of the example methods disclosed herein. For instance, the application $104_A$ may include code for identifying a vehicle utility (e.g., a vehicle function, a vehicle condition, or a personal item disposed inside the vehicle 12), and for formulating a message pertaining to the vehicle utility. As will be described in further detail below, the message is formulated into a format suitable for presentation on the mobile device 100, 100', 100". Examples of other software program(s)/application(s) that is/are executable by the processor 36 will be described below in conjunction with the various examples of the vehicle-related messaging methods of the present disclosure.

Still referring to FIG. 1, the location detection chipset/component 44 may include a Global Position System (GPS) receiver, a radio triangulation system, a dead reckoning position system, and/or combinations thereof. In particular, a GPS receiver provides accurate time and latitude and longitude coordinates of the vehicle 12 responsive to a GPS broadcast signal received from a GPS satellite constellation (not shown).

The cellular chipset/component 40 may be an analog, digital, dual-mode, dual-band, multi-mode and/or multi-band cellular phone. Basically, the cellular chipset 40 is a semiconductor engine that enables the telematics unit 14 to connect with other devices (e.g., other mobile communications devices such as the user's mobile communications device 100) using some suitable type of wireless technology. The cellular chipset-component 40 uses one or more prescribed frequencies in the 800 MHz analog band or in the 800 MHz, 900 MHz, 1900 MHz and higher digital cellular bands. In some cases, the cellular chipset/component 40 may also use a frequency below 800 MHz, such as 700 MHz or lower. In yet other cases, the cellular chipset/component 40 may use a frequency above 2600 MHz. Any suitable protocol may be used, including digital transmission technologies, such as TDMA (time division multiple access), CDMA (code division multiple access), GSM (global system for mobile telecommunications), and LTE (long term evolution). In some instances, the protocol may be short range wireless communication technologies, such as BLUETOOTH®, dedicated short range communications (DSRC), or Wi-Fi™. In other instances, the protocol is Evolution Data Optimized (EVDO) Rev B (3G) or Long Term Evolution (LTE) (4G). In an example, the cellular chipset/component 40 may be used in addition to other components of the telematics unit 14 to establish communications between the vehicle 12 and another party.

Also associated with electronic processing device 36 is the previously mentioned real time clock (RTC) 46, which provides accurate date and time information to the telematics unit 14 hardware and software components that may require and/or request date and time information. In an example, the RTC 46 may provide date and time information periodically, such as, for example, every ten milliseconds.

The electronic memory 38 of the telematics unit 14 may be configured to store data associated with the various systems of the vehicle 12, vehicle operations, vehicle user preferences and/or personal information, and the like. In an example, the electronic memory 38 also stores user-selected preferences (e.g., preferences selected by the user for how a message is to be formulated). The user-selected preferences may be, for example, created at the time the user sets up his/her account with the telematics call center 24 (such as upon subscribing for telematics services) via the remotely accessible page 98, by speaking with an advisor $62_A$, $62_B$ at the call center 24 during a phone call, etc. The user-selected preferences may be downloaded to the telematics unit 14 upon selecting the preferences, and updates to the user-selected preferences may be downloaded each time the preferences are updated (e.g., upon accessing the webpage 98 and changing the user-selected preferences, calling the call center 24, etc.). Updates to the user-selected preferences may include adding a new preference, deleting an existing preference, or changing a then-currently existing preference.

The electronic memory 38 may also store a post-operation vehicle checklist that the processor 36 may refer to when attempting to identify a vehicle utility. The checklist may include a plurality of items, each of which corresponds to a respective vehicle function and includes a standard. In one example method, the processor 36, via the application resident $104_A$ resident therein, compares a then-current state of the respective vehicle function to this standard when attempting to identify the vehicle utility. If the vehicle utility is identified, in this example method, the telematics unit 14 will formulate a vehicle-related message that includes a suggestion, a recommendation, an indication, or a notification pertaining to the identified vehicle utility. In another example method, an application $104_B$ may be resident on the mobile device (e.g., device 100 shown in FIGS. 1 and 2), and the application $104_B$ is designed, in part, to poll the processor 36 to perform steps of the method upon receiving a notification from the telematics unit 14 that the vehicle 12 is no longer in operation. For instance, the device 100, via the application $104_B$, polls the processor 36 to identify the vehicle utility. Further details of the application $104_B$ will be described below in conjunction with FIG. 3, and further details of the checklist and the process(es) for identifying the vehicle utility will be described in conjunction with an example method of the present disclosure shown in FIG. 3.

The telematics unit 14 provides numerous services alone or in conjunction with the call center 24, some of which may not be listed herein, and is configured to fulfill one or more user or subscriber requests. Several examples of these services include, but are not limited to: turn-by-turn directions and other navigation-related services provided in conjunction with the GPS based chipset/component 44; airbag deployment notification and other emergency or roadside assistance-related services provided in connection with various crash and or collision sensor interface modules 52 and sensors 54 located throughout the vehicle 12; and infotainment-related services where music, Web pages, movies, television programs, videogames and/or other content is downloaded by an infotainment center 56 operatively connected to the telematics unit 14 via vehicle bus 34 and audio bus 58. In one example, downloaded content is stored (e.g., in memory 38) for current or later playback.

Again, the above-listed services are by no means an exhaustive list of all the capabilities of telematics unit 14, but are simply an illustration of some of the services that the telematics unit 14 is capable of offering. It is to be understood that when these services are obtained from the call center 24, the telematics unit 14 is considered to be operating in a telematics service mode.

Vehicle communications generally utilize radio transmissions to establish a voice channel with carrier system 16 such that both voice and data transmissions may be sent and received over the voice channel. Vehicle communications are enabled via the cellular chipset/component 40 for voice communications and the wireless modem 42 for data transmission. In order to enable successful data transmission over the voice channel, wireless modem 42 applies some type of encoding or modulation to convert the digital data so that it can communicate through a vocoder or speech codec incorporated in the cellular chipset/component 40. It is to be understood that any suitable encoding or modulation technique that provides an acceptable data rate and bit error may be used with the examples disclosed herein. In one example, an Evolution Data Optimized (EVDO) Rev B (3G) system (which offers a data rate of about 14.7 Mbit/s) or a Long Term Evolution (LTE) (4G) system (which offers a data rate of up to about 1 Gbit/s) may be used. These systems permit the transmission of both voice and data simultaneously. Generally, dual mode antenna 50 services the location detection chipset/component 44 and the cellular chipset/component 40.

The microphone 28 provides the user with a means for inputting verbal or other auditory commands, and can be equipped with an embedded voice processing unit utilizing human/machine interface (HMI) technology known in the art. Conversely, speaker(s) 30, 30' provide verbal output to the vehicle occupants and can be either a stand-alone speaker 30 specifically dedicated for use with the telematics unit 14 or can be part of a vehicle audio component 60, such as speaker 30'. In either event and as previously mentioned, microphone 28 and speaker(s) 30, 30' enable vehicle hardware 26 and telematics service call center 24 to communicate with the occupants through audible speech. The vehicle hardware 26 also includes one or more buttons, knobs, switches, keyboards, and/or controls 32 for enabling a vehicle occupant to activate or engage one or more of the vehicle hardware components. In one example, one of the buttons 32 may be an electronic pushbutton used to initiate voice communication with the telematics service provider call center 24 (whether it be a live advisor $62_A$ or an automated call response system $62_B$) to request services, to initiate a voice call to another mobile communications device, etc.

The audio component 60 is operatively connected to the vehicle bus 34 and the audio bus 58. The audio component 60 receives analog information, rendering it as sound, via the audio bus 58. Digital information is received via the vehicle bus 34. The audio component 60 provides AM and FM radio, satellite radio, CD, DVD, multimedia and/or other like functionality independent of the infotainment center 56. Audio component 60 may contain a speaker system (e.g., speaker 30'), or may utilize speaker 30 via arbitration on vehicle bus 34 and/or audio bus 58.

Still referring to FIG. 1, the vehicle crash and/or collision detection sensor interface 52 is/are operatively connected to the vehicle bus 34. The crash sensors 54 provide information to the telematics unit 14 via the crash and/or collision detection sensor interface 52 regarding the severity of a vehicle collision, such as the angle of impact and the amount of force sustained.

Other vehicle sensors 64, connected to various sensor interface modules 66 are operatively connected to the vehicle bus 34. Example vehicle sensors 64 include, but are not limited to, gyroscopes, accelerometers, speed sensors, magnetometers, emission detection and/or control sensors, environmental detection sensors (e.g., temperature sensors), vehicle equipment sensors (e.g., seat weight sensors, seat belt sensors, etc.), and/or the like.

One or more of the sensors 64 enumerated above may be used to obtain vehicle data for use by the telematics unit 14 to i) detect that the vehicle is no longer in operation, and ii) identify a vehicle utility. For instance, data from the seat belt sensor 64 may indicate that a seat belt locking mechanism of the driver's seat has been released. The telematics unit 14, via the processor 36, may utilize the information obtained from the seat belt sensor 64 to determine that the vehicle driver has left the vehicle 12, and the processor 36 may utilize such information in combination with other data to then detect that the vehicle 12 is no longer in operation. After detecting that the vehicle 12 is no longer in operation, data received from the vehicle door locking system may be used, by the processor 36 upon checking the post-operation checklist, that the vehicle doors are unlocked. From this information, the processor 36 identifies the vehicle door locking function as a vehicle utility subject to the vehicle-related messaging methods described herein.

Some examples of sensor interface modules 66 include powertrain control, climate control, body control, and/or the like.

In an example, each of the vehicle sensors 64 is associated with its own processor (not shown), which may include computer program(s) for obtaining information from the sensors 64 and either utilizing them to perform various vehicle functions and/or to send the information (e.g., as signals) to another processor in the vehicle 12 (e.g., the processor 36) to be utilized in other computer program(s). For instance, the temperature sensor may be associated with its own processor that obtains temperature readings from the temperature sensor, and transmits those signals to the processor 36 of the telematics unit 14 via the bus 34. The temperature readings include information pertaining to the instantaneous temperature inside the vehicle, and the processor associated with the temperature sensor forwards the temperature readings to the processor 36 of the telematics unit 14. The instantaneous (or then-current) vehicle temperature may be used, by the telematics unit 14 for example, when formulating the vehicle-related message that will be transmitted to the mobile communications device 100.

The vehicle hardware 26 includes the display 80, which may be operatively directly connected to or in communication with the telematics unit 14, or may be part of the audio component 60. The display 80 may be any human-machine interface (HMI) disposed within the vehicle 12 that includes audio, visual, haptic, etc. The display 80 may, in some instances, be controlled by or in network communication with the audio component 60, or may be independent of the audio component 60. Examples of the display 80 include a VFD (Vacuum Fluorescent Display), an LED (Light Emitting Diode) display, a driver information center display, a radio display, an arbitrary text device, a heads-up display (HUD), a touchscreen display, an LCD (Liquid Crystal Display), and/or the like. The display 80 may be referred to herein as a graphic user interface (GUI).

The vehicle 12 may include other components, such as an in-vehicle camera 82 and/or an RFID reader 84. These additional components will be described further herein in reference to one or more of the other figures. It is to be understood that each of the additional components is operatively connected to the vehicle bus 34 so that they are in selective communication with the telematics unit 14.

As mentioned above, the system 10 includes the carrier/communication system 16. A portion of the carrier/communication system 16 may be a cellular telephone system or any other suitable wireless system that transmits signals between the vehicle hardware 26 and land network 22. According to an example, the wireless portion of the carrier/communication system 16 includes one or more cell towers 18, base stations 19 and/or mobile switching centers (MSCs) 20, as well as any other networking components required to connect the wireless portion of the system 16 with land network 22. It is to be understood that various cell tower/base station/MSC arrangements are possible and could be used with the wireless portion of the system 16. For example, a base station 19 and a cell tower 18 may be co-located at the same site or they could be remotely located, or a single base station 19 may be coupled to various cell towers 18, or various base stations 19 could be coupled with a single MSC 20. A speech codec or vocoder may also be incorporated in one or more of the base stations 19, but depending on the particular architecture of the wireless network 16, it could be incorporated within an MSC 20 or some other network components as well.

Land network 22 may be a conventional land-based telecommunications network that is connected to one or more landline telephones and connects the wireless portion of the carrier/communication network 16 to the call/data center 24. For example, land network 22 may include a public switched telephone network (PSTN) and/or an Internet protocol (IP) network. It is to be understood that one or more segments of the land network 22 may be implemented in the form of a standard wired network, a fiber or other optical network, a cable network, wireless networks, such as wireless local networks (WLANs) or networks providing broadband wireless access (BWA), or any combination thereof.

The call center 24 of the telematics service provider is designed to provide the vehicle hardware 26 with a number of different system back-end functions. According to the example shown in FIG. 1, the call center 24 generally includes one or more switches 68, servers 70, databases 72, live and/or automated advisors $62_A$, $62_B$, processing equipment (or processor) 78, as well as a variety of other telecommunication and computer equipment 74 that is known to those skilled in the art. These various telematics service provider components are coupled to one another via a network connection or bus 76, such as one similar to the vehicle bus 34 previously described in connection with the vehicle hardware 26.

The processor 78, which is often used in conjunction with the computer equipment 74, is generally capable of executing suitable software and/or programs which enable the processor 78 to accomplish a variety of call center 24 functions. Further, the various operations of the call center 24 are carried out by one or more computers (e.g., computer equipment 74) programmed to carry out some of the tasks of the call center 24. The computer equipment 74 (including computers) may include a network of servers (including server 70) coupled to both locally stored and remote databases (e.g., database 72) of any information processed. The processor 78 may further be capable of executing software programs/applications for performing one or more steps of the example methods disclosed herein. For instance, the checklist may be stored in one of the databases 72, and the processor 78 may execute an application that runs through the checklist utilizing vehicle data received from the telematics unit 14 to identify one or more vehicle functions or conditions as a vehicle utility subject of a vehicle-related message for the user.

Switch 68, which may be a private branch exchange (PBX) switch, routes incoming signals so that voice transmissions are usually sent to either the live advisor $62_A$ or the automated call response system $62_B$, and data transmissions are passed on to a modem (similar to modem 42) or other piece of equipment (not shown) for demodulation and further signal processing. The modem preferably includes an encoder, as previously explained, and can be connected to various devices such as the server 70 and database 72.

It is to be appreciated that the call center 24 may be any central or remote facility, manned or unmanned, mobile or fixed, to or from which it is desirable to exchange voice and data communications. As such, the live advisor $62_A$ may be physically present at the call center 24 or may be located remote from the call center 24 while communicating therethrough.

The communications network provider 90 generally owns and/or operates the carrier/communication system 16. The communications network provider 90 includes a mobile network operator that monitors and maintains the operation of the communications network 90. The network operator directs and routes calls, and troubleshoots hardware (cables, routers, network switches, hubs, network adaptors), software, and communications. It is to be understood that, although the communications network provider 90 may have back-end equipment, employees, etc. located at the telematics service provider call center 24, the telematics service provider is a separate and distinct entity from the network provider 90. In an example, the equipment, employees, etc. of the communications network provider 90 are located remote from the call center 24. The communications network provider 90 provides the user with telephone and/or Internet services, while the telematics service provider provides a variety of telematics-related services (such as, for example, those discussed hereinabove). The communications network provider 90 may interact with the call center 24 to provide services (such as emergency services) to the user.

While not shown in FIG. 1, it is to be understood that in some instances, the call center 24 operates as a data center, which receives voice or data calls, analyzes the request associated with the voice or data call, and transfers the call to an application specific call center associated with the telematics service provider. In these instances, the telematics service provider may include a plurality of application specific call centers that each communicates with the data center 24, and possibly with each other. It is further to be understood that the application specific call center(s) may include all of the components of the data center 24, but is a dedicated facility for addressing specific requests, needs, etc. Examples of application specific call centers include emergency services call centers, navigation route call centers, in-vehicle function call centers, or the like.

As previously mentioned, the system 10 utilizes the mobile device 100, which is in selective communication with the telematics unit 14 of the vehicle 12 via short range or long range wireless connections or by other connections through the carrier system 16. The device 100 is also in selective communication with the call center 24 also through the carrier system 16.

The mobile device 100 shown in FIG. 1 will now be described in further detail in conjunction with FIG. 2. The device 100 may be chosen from any mobile communications device that is capable of storing and running applications (i.e., "apps") thereon. Some examples of such devices 100 include smartphones (such as the iPhone®, Android™, and the like), tablet computers (such as the iPad® or the like), and laptop computers.

Figure 2:
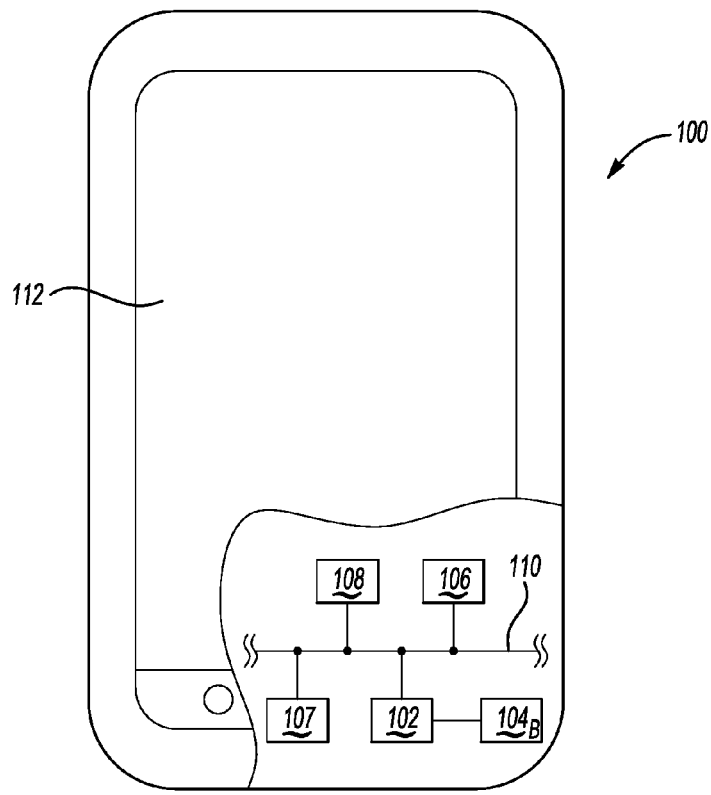
FIG. 2 semi-schematically depicts an example of a mobile communications device.

The device 100 shown in FIG. 2 includes a touchscreen interface 112, which is a display upon which information (e.g., a vehicle-related message) may be presented. The touchscreen interface 112 is also configured, via suitable electrical components, to detect the presence and location of touch (e.g., by the user's finger) on the display area of the screen. In an example, the user may touch the touchscreen interface 112 in order to select an actionable item contained in the vehicle-related message, which will be described in further detail below.

The device 100 also includes a number of electronic components, all of which are operatively connected to an information bus 110. One of the electronic components includes a processor 102 which may be a microprocessor configured to run apps on the device 100, such as the application $104_B$. The application $104_B$ runs on the operating system of the mobile communications device 100, and the application $104_B$ contains software code specifically designed to present a vehicle-related message on the device 100. In one example disclosed herein, the application $104_B$ further includes code designed to poll the processor 36 of the telematics unit 14 to identify a vehicle utility in response to a notification from the telematics unit that the vehicle 12 is no longer in operation.

In an example, the application $104_B$ may also include computer readable code for recognizing the type of mobile communications device 100 upon which the application $104_E$ resides, and such computer readable code enables the application $104_B$ to automatically optimize its usability based on the device type. For instance, if the application $104_B$ resides on a tablet computer or a smartphone having a touchscreen interface 112, then the application $104_B$ will optimize its usability to accommodate the touchscreen user interface 112. If the application $104_B$ resides on a laptop computer, for instance, then the application $104_B$ will optimize its usability for a mouse click or keyboard user interface.

The application $104_E$ may be downloaded to the user's mobile communications device 100 from a server of the telematics service provider, which is owned by the telematics service provider. This may be accomplished, for example, by accessing a webpage owned and/or run by the telematics service provider (e.g., the webpage 98), and downloading the application $104_B$ to the mobile communications device 100 from the webpage 98. The downloadable version of the application $104_B$ may otherwise be obtained from an application store, e.g., iTunes®, Google® Apps, the Android Markpetplace, or the like.

The processor 102 is also configured to run other software programs for performing various functions of the mobile device 100, as well as other apps downloaded to the device 100.

Other electronic components of the device 100 include a short range wireless connection unit 106, a cellular chipset 107, and a location detection unit 108. The short range wireless connection unit (e.g., a BLUETOOTH®, Wi-Fi™, etc.) may be used to establish short range wireless connections between the device 100 and another device (e.g., the vehicle telematics unit 14), while the cellular chipset 107 may be used to establish other wireless connections between the device 100 and the other device (e.g., 14). In an example, short range wireless connections may be established within a short range connection range of within 10 meters (e.g., within 33 feet). At longer distances, the cellular chipset 107 may be used to establish wireless connections, such as a packet data connection. The cellular chipset 107 may also be used to send/receive text messages to the other device (e.g., 14). Further, the location detection unit 108 is configured to obtain then-current GPS coordinate information of the device 100.

One example of the vehicle-related messaging method will now be described herein in conjunction with FIGS. 1-3. This example of the method utilizes the mobile communications device 100, which, as noted above, is a device that is capable of running apps thereon.

Figure 3:
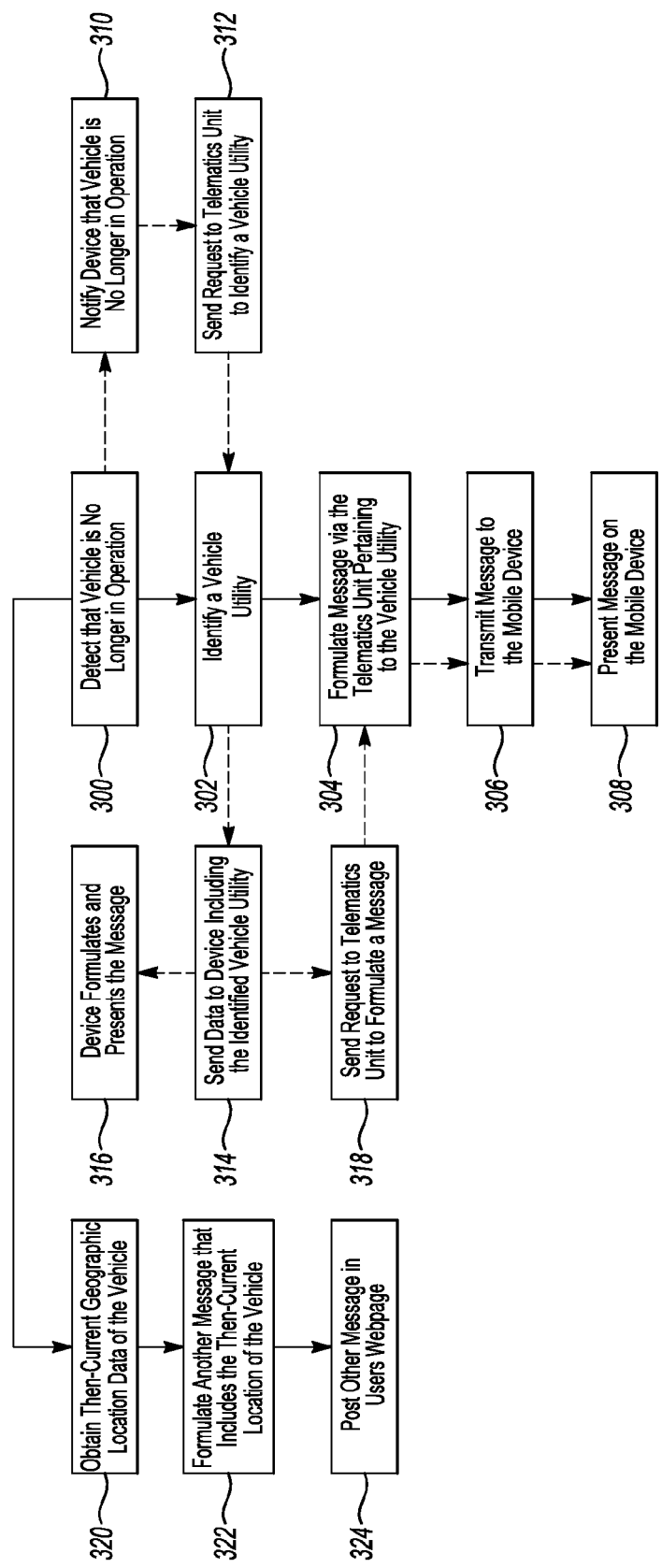
FIG. 3 is a flow diagram depicting an example of a vehicle-related messaging method utilizing the system of FIG. 1.
Figure 5:
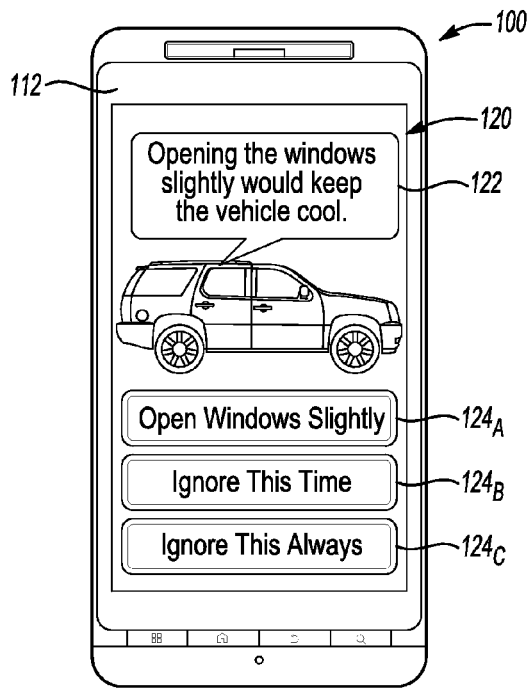
FIG. 5 semi-schematically depicts the example of the communications device of FIG. 2 having an example of a vehicle-related message presented thereon.

Referring now to FIG. 3, at step 300, the method involves detecting that the vehicle 12 is no longer in operation. In an example, the telematics unit 14 may perform this step upon receiving a signal from one or more of the sensors 64 disposed in the vehicle 12. The signals include information indicating, in some form, that vehicle-related event(s) has/have just occurred. Examples of vehicle-related events will be described in detail hereinbelow. Upon receiving the signal(s), the processor 36 of the telematics unit 14 processes the information contained in the signal(s) to determine whether the vehicle 12 is no longer in operation.

As previously mentioned, the vehicle 12 is no longer in operation when a mode of activity of the vehicle 12 had just ended, and when a mode of inactivity of the vehicle 12 has just begun. In other words, the vehicle 12 was in operation and now is no longer in operation. When the vehicle 12 is in a mode of activity, the vehicle 12 engine is running (i.e., the ignition system of the vehicle 12 is in an ON state), and the vehicle 12 is capable of being controlled by a vehicle driver while physically present inside the vehicle 12. The vehicle driver (who may also be the user, and who is inside the vehicle 12) may activate the vehicle ignition system by placing a vehicle ignition key into a key slot inside the vehicle 12, and turning the key to power on the vehicle 12. The vehicle ignition system may have otherwise been activated via other known methods, such as by pressing an ignition button disposed on the dashboard, steering console, or other suitable spot inside the vehicle 12.

As used herein, the vehicle 12 is "controlled" by the vehicle driver when the vehicle driver is in a position to actuate the gas and brake pedals and can physically operate the vehicle transmission system, e.g., by placing the transmission system into a drive mode, a reverse mode, or any mode other than a park mode. In an example, the vehicle 12 is controlled by the vehicle driver when the vehicle driver is in a position to set, and actually sets the vehicle 12 into motion.

The vehicle 12 is no longer in operation as soon as the vehicle 12 has been placed into a mode of inactivity. In an example, the telematics unit 14 identifies the mode of inactivity as soon as the telematics unit 14 detects that one or more of the vehicle-related events have occurred.

A vehicle-related event is an incident occurring within the vehicle 12 that is detectable by certain vehicle sensors 64. The incident is indicative of the fact that the vehicle 12 that was previously in operation is no longer in operation. Examples of the vehicle-related event are described hereinbelow. It is to be understood that some of these events may be indicative of the fact that the user has physically left the vehicle 12. If so, and knowing that the user was also the vehicle driver, then the telematics unit 14 detects that the vehicle 12 is no longer in operation. The user "physically leaves the vehicle 12" when the user removes himself/herself from the passenger compartment of the vehicle 12, and the user is now physically located somewhere outside of the vehicle 12. Methods for detecting the presence of the vehicle driver are described below.

Some of the other vehicle-related events may be indicative of the fact that the user is still physically located inside the vehicle 12, but the user is not controlling any of the vehicle systems or functions. For example, the ignition may be turned off, but the in-vehicle camera 82 or sensor(s) 64 in the driver's seat may detect the driver's presence. In these cases, the telematics unit 14 may still detect that the vehicle 12 is no longer in operation, but the method may be modified to account for the fact that the user has not yet left the vehicle 12. In one example, the vehicle-related message may be formulated and sent to the mobile device 100 after a predetermined amount of time has expired after detecting that the vehicle 12 is no longer in operation. This may allow the user to have some time to physically leave the vehicle 12. It may, in some instances, be beneficial to formulate and send the vehicle-related message immediately after detecting that the vehicle 12 is no longer in operation, even though the user has not yet left the vehicle 12. In these instances, the user can be notified of anything he/she may have forgotten even before the user has physically left the vehicle 12.

Additionally, upon receiving a signal pertaining to one or more of the examples of the vehicle-related events, the telematics unit 14 may have to verify that the user was the vehicle driver (and not another passenger in the vehicle 12). This situation may arise, for example, when the telematics unit 14 detects that a short range wireless connection has ended (which may occur, e.g., when the mobile device 100 has been moved to a position that is outside of a short range wireless connection range) between the user's device 100 and the telematics unit 14. In instances where the user was the vehicle driver, the telematics unit 14 may conclude that the vehicle driver has physically left the vehicle 12 when the connection is lost (e.g., the user may have carried his/her device 100 to a location outside of the vehicle 12, which may be outside of the wireless connection range). In instances where the user is another passenger of the vehicle 12, then the user may have left the vehicle 12 (again, by virtue of the fact that the wireless connection was lost), but the vehicle driver (who was not the user) is still in the driver's seat and is potentially still operating the vehicle 12 (e.g, the vehicle engine is running and the vehicle transmission system is in drive mode, but the vehicle driver has his/her foot on the brake pedal at the time when the user is leaving the vehicle 12).

One way of verifying that the user is (or is not) the vehicle driver includes spatially recognizing the vehicle driver's physical features, such as the shape, color, and features of the driver's face. In an example, a facial imaging camera (such as the camera 82) may be positioned inside the vehicle 12 such that the camera 82 faces or is operable to face the driver's seat. For example, the camera 82 may be positioned on the dashboard, on the rearview mirror, on the steering wheel, or the like. The camera 82 may be used to take images or video of the person that is then-currently occupying the driver's seat. In some cases, the camera 82, via a processor operatively associated therewith (not shown), may have been trained to recognize the user. For example, each time the vehicle 12 is powered on, the camera 82 captures an image or video of the vehicle driver and any passengers inside the vehicle 12 and remembers the images/video. Over time, the camera 82 (via the processor operatively associated with the camera 82) will start to recognize a common vehicle driver and common passengers of the vehicle 12. The processor can then determine if the same vehicle driver or passengers are then-currently operating the vehicle 12. When the processor of the facial imaging camera 82 does not recognize the person occupying the driver's seat as being the user, the processor will conclude that the user is not the vehicle driver. In other cases, the images/video taken by the facial imaging camera 82 are/is transmitted to the call center 24, where the processor 78 (running suitable software programs) compares the images/video to other images of the user that were previously stored in a user profile to make a verification. In yet other cases, the call center 24 (again via suitable software programs) may compare the images/video to previously tagged photographs or other pictures (via, e.g., recognition software run by the networking website) posted on the user's networking page 94, such as his/her Facebook™ page.

Another way of verifying that the user is the vehicle driver includes requesting the vehicle driver to verbally recite an utterance into the microphone 28 that is operatively connected to the telematics unit 14. The utterance may include information identifying the person who is occupying the driver's seat, such as the persons' name. The telematics unit 14 may then use the person's name to identify the driver, and to verify that the driver is or is not the user. In another example, the telematics unit 14 may use voice recognition software to recognize the person who is speaking based on a comparison of the person's utterances with a previously stored voice print of the user.

Examples of the vehicle-related events will now be described herein. One example of the event includes switching the transmission system of the vehicle 12 into a park mode, and then switching the ignition system of the vehicle 12 to an OFF state. This event is thus a combination of two events, and thus two signals are sent to the telematics unit 14. Upon processing both of these signals, the telematics unit 14 (via the processor 36) detects that the vehicle 12 is no longer in operation. For instance, the switching of the vehicle transmission system into the park mode may be recognized by one of the sensors 64, where this particular sensor is operatively associated with a vehicle transmission system. The sensor recognizes that the vehicle transmission system has been switched into the park mode when the vehicle driver (who may be the user or another person having the user as his/her passenger) shifts the transmission shifting lever from, e.g., the drive mode into the park mode. Upon recognizing this event, the sensor 64 automatically sends a signal from the vehicle transmission system to the telematics unit 14 indicating that the event has occurred. It is to be understood, however, that the telematics unit 14 does not detect that the vehicle 12 is no longer in operation until the telematics unit 14 also receives a signal from another sensor 64 that is associated with the vehicle ignition system indicating that the ignition system has been switched to an OFF state. The switching of the vehicle ignition system to the OFF state may be accomplished by removing the ignition key from the key slot, depressing a vehicle ignition button on the dashboard, or the like.

In instances where the telematics unit 14 does not receive a signal from the vehicle ignition system sensor 64 indicating that the ignition system has been switched to the OFF state (i.e., the ignition system is still in an ON state) but receives a signal from the vehicle transmission system that the vehicle 12 has been switched into the park mode, the telematics unit 14 will conclude that the vehicle 12 is still in operation. In this situation, however, the telematics unit 14 may look for other signals from other sensors 64 inside the vehicle 12 to determine whether or not the user has left the vehicle 12. In other words, the telematics unit 14 may utilize a multi-variable approach in order to detect that the vehicle 12 is no longer in operation. As an illustrative example, the user may have left the vehicle 12 running in a friend's driveway while the user is physically inside the house visiting his/her friend. Upon recognizing the user as the vehicle driver, signals from a seat belt sensor and a driver's seat weight sensor (both of which are described below) may indicate that no other persons are then-currently occupying the driver's seat of the vehicle 12 even though the vehicle engine is still running. In this instance then, the telematics unit 14 may determine that the vehicle 12 is no longer in operation.

Another example of a vehicle-related event includes, and as previously mentioned, detecting that a short range wireless connection has ended. It is assumed that, for this example, the short range wireless connection was previously established between the telematics unit 14 and the user's mobile communications device 100. Typically, the connection is made as soon as the user's mobile device 100 comes within wireless connection range with the telematics unit 14, assuming that the two devices 14, 100 recognize each other (i.e., have already been paired). In an example, the wireless connection range may extend to distances within the vehicle 12, and possibly to areas surrounding the exterior of the vehicle 12. In one example, the wireless connection range may extend to distances up to about 10 meters. While the device 100 is within this range, the device 100 will connect/remain connected with the telematics unit 14. The connection is lost (or ends) as soon as the device 100 is moved to a location outside of the wireless connection range, e.g., beyond 10 meters, or the connection is manually termination by the user. In some instances, as soon as the wireless connection ends, the telematics unit 14 assumes that the user (who owns the device 100) has left the vehicle 12.

It is to be understood that the telematics unit 14 does not determine that the vehicle 12 is no longer in operation by virtue of the lost wireless connection unless the telematics unit 14 has already verified that the user was the vehicle driver. Verification of the user as being the vehicle driver is accomplished when the vehicle 12 is in operation, and may be accomplished using any of the verification methods described above. If the telematics unit 14 verified that the user was the vehicle driver, and that the wireless connection has ended, then the telematics unit 14 may conclude that the vehicle 12 is no longer in operation. However, when the telematics unit 14 has verified that the user was not the vehicle driver, then the telematics unit 14 cannot use the lost wireless connection as an event to detect that the vehicle 12 is no longer in operation. The telematics unit 14 will then look for another signal representing the occurrence of another event in order to detect that the vehicle 12 is no longer in operation.

In some instances, the short range wireless connection between the telematics unit 14 and the device 100 may end even though the user is still physically inside the vehicle 12. For instance, the device 100 may have fallen outside of one of the vehicle windows, the device 100 ran out of battery power, the user set the device 100 into airplane mode, and/or the user deactivated the short range wireless connection. In an example, upon detecting that the wireless connection has ended, the telematics unit 14 may automatically utilize the multi-variable approach mentioned above in order to detect that the vehicle 12 is no longer in operation. In an example, upon detecting that the wireless connection has ended, the telematics unit 14 may look for signals received, for example, from the seat belt sensor, the driver's seat weight sensor, etc. before detecting that the vehicle 12 is in fact no longer in operation.

Another example of a vehicle-related event includes detecting that there are no persons inside the vehicle 12. This event may be detected from images taken by an in-vehicle camera, which may be the facial imaging camera 82 described above or may be another camera that is operatively disposed inside the vehicle 12. The other camera (not shown) may be a rotatable camera, such as a reverse parking aid camera, that is operatively disposed in or on the vehicle 12. In instances where the reverse parking aid camera is used, the camera may be located proximate a rear side of the vehicle 12. The vehicle 12 may include more than one camera. For example, one camera may be disposed at a rear side of the vehicle 12 and another camera may be disposed at a front side of the vehicle 12.

The camera(s) (such as the camera 82) may include an imaging component for capturing images of the vehicle interior, and may include a processing unit that processes the images captured. The processing unit, via suitable software programs/routines, analyzes the captured images to determine whether or not any persons are inside the vehicle 12. In an example, the camera(s) may be trained to recognize general characteristics of a person, such as a general shape of a person. From the images, the processor of the camera 82 may compare the images with the recognized shape of a person to determine if any persons are then-currently inside the vehicle 12. Upon making the determination, the processing unit of the camera 82 sends a signal to the telematics unit 14 via the bus 34 indicating that no persons are present. Upon receiving the signal, the telematics unit 14 assumes that no persons are physically inside the vehicle 12, and then determines that the vehicle 12 is no longer in operation. In another example, the processing unit of the camera 82 may identify a small person in the backseat and send a signal to the telematics unit 14 indicating the presence of the small person. Upon receiving this signal, the telematics unit 14 may assume that the vehicle 12 is no longer in operation.

One more vehicle-related event includes detecting that the driver's seat weight has changed to a null state. In this example, one of the sensors 64 is operatively connected to the driver's seat, and the sensor 64 may be used to measure a then-current seat weight (i.e., the weight of the driver's seat alone plus any additional weight on the seat (e.g., additional weight due to the presence of a person, an animal, or an object that may be sitting on the seat)). The weight of the seat alone is then subtracted from the then-current seat weight to come up with a calculated seat weight. If the calculated weight is zero, then the telematics unit 14 will conclude that no person, object, etc. is then-currently occupying the seat. The telematics unit 14 may, in another example, compare the calculated seat weight with a seat weight measured when the vehicle 12 was in operation. If the value has changed from a positive state (indicating that the seat was being occupied) to a null state (indicating that the seat is not being occupied), then the telematics unit 14 detects that the vehicle 12 is no longer in operation.

A further example of a vehicle-related event includes detecting that a seat belt locking mechanism operatively connected to the driver's seat has been released. This condition may be detected by another one of the sensors 64 that is operatively connected to driver's seat belt locking mechanism. When the seat belt is unlatched or unlocked, the sensor 64 transmits a seatbelt unlock signal to the telematics unit 14. Upon receiving the signal, the telematics unit 14 may assume that after releasing the driver's seat belt locking mechanism, the person occupying the driver's seat has or is about to leave the vehicle 12. To ensure that the vehicle driver has in fact left the vehicle, the telematics unit 14 may look for another signal representing another event (e.g., an indication that no persons are inside the vehicle as determined from images taken from the in-vehicle camera(s) 82) before detecting that the vehicle 12 is no longer in operation.

Yet another vehicle-related event may occur as a result of the telematics unit 14, via the processor 36, detecting that a then-current location of the vehicle 12 (taken at time $t_1$) is the same as the location of the vehicle 12 taken at time $t_0$. The detection may be made by calculating the difference between the GPS location data of the vehicle 12 at time $t_0$ (taken from the GPS location detection unit 44) and GPS location data of the vehicle 12 at time $t_1$ (also taken from the GPS location detection unit 44). If the difference amounts to a small numerical value (which may be a value that is close to zero) that is appropriate for the overall expected accuracy of the GPS detection unit 44 under ideal conditions, the telematics unit 14 may determine that the vehicle is no longer in operation. In one example, a difference of about 10 meters may indicate that the then-current location of the vehicle 12 at $t_1$ is about the same as the location of the vehicle 12 at $t_0$. If so, then the telematics unit 14 will assume that the vehicle 12 has not moved from time $t_0$ to time $t_1$, and will detect that the vehicle 12 is no longer in operation.

In another example, the GPS location data may be used, by the processor 36 of the telematics unit 14, to determine if a then-current location of the vehicle 12 coincides with a destination point of a recent trip. When the then-current vehicle location is the destination point, the telematics unit 14 may then assume that the vehicle 12 has not moved because the then-current location of the vehicle 12 indicates that the vehicle 12 reached the destination point. At this point, the telematics unit 14 is said to have detected that the vehicle 12 is no longer in operation.

Still further, a vehicle-related event may be based on a measured distance between a then-current location of the vehicle 12 and a then-current location of the mobile communications device 100. If the measured distance exceeds a predefined value (e.g., the measured distance is greater than a wireless connection range (e.g., 10 meters)), then the telematics unit 14 will conclude that the mobile device 100 is located outside of the vehicle 12. The telematics unit 14 will also perform one of the driver identification/verification methods described above to determine whether the user is also outside of the vehicle 12. If the telematics unit 14 determines that the user was not the vehicle driver, then the telematics unit 14 will look for another signal indicative of another event that occurred to detect that the vehicle 12 is no longer in operation.

Figure 4:
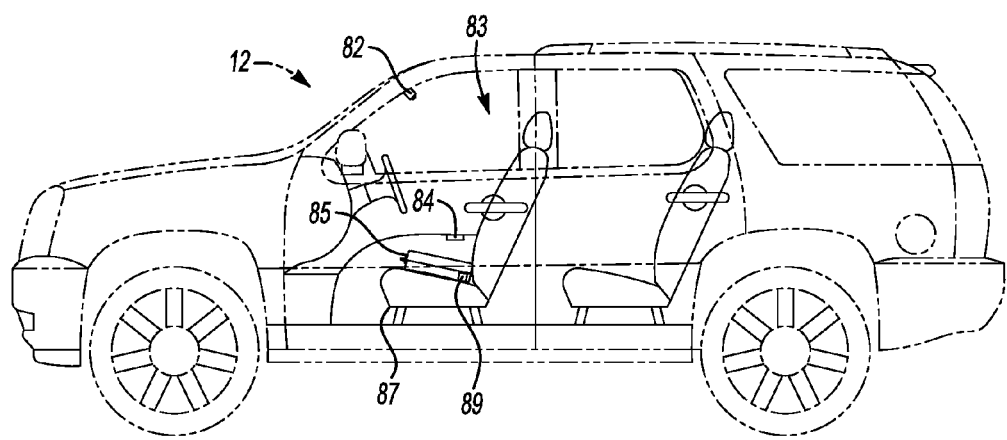
FIG. 4 semi-schematically depicts an example of a vehicle interior within which a personal item is disposed.

Upon detecting that the vehicle 12 is no longer in operation, the telematics unit 14 identifies a vehicle utility that may be the subject of a vehicle-related message for the user. The identification of the vehicle utility occurs at step 302 in FIG. 3, and this step is accomplished by the processor 36 running suitable software programs/routines. As stated above, the vehicle utility may be a vehicle function, a vehicle condition, or a personal item disposed inside the vehicle 12 (an example of which is shown in FIG. 4). Examples of vehicle functions include a vehicle door locking/unlocking function, a vehicle window opening/closing function, a vehicle radio preset function, a remote vehicle ignition starting function, a driver or passenger seat adjustment function, and the like. Examples of vehicle conditions include an awake/alive (i.e., ON) condition versus a standby/sleep (i.e., OFF) condition. Personal items may be tangible goods or articles that fit inside the vehicle, and some examples of personal items include a briefcase, a purse, an electronic device (e.g., a phone or an mp3 player), an umbrella, an article of clothing (e.g., a jacket, a hat, gloves, shoes, etc.), jewelry (e.g., a wedding ring, a bracelet, ear rings, and/or the like), etc. A personal item may also be a living being, such as an animal (e.g., a dog, a cat, a bird, etc.) or a person (such as, e.g., a child).

Identification of the vehicle utility will now be described for instances when the vehicle utility is a vehicle function or a vehicle condition. In one example, the processor 36 of the telematics unit 14 may include computer program code that runs through a post-operation vehicle checklist stored in the memory 38. Upon receiving the vehicle data, the processor 36, via an application including computer readable code, pulls up the checklist from the memory 38 and runs through the checklist to determine if each of the vehicle functions and conditions meet the standards set forth in the checklist. In another example, the checklist is stored at the call center 24, e.g., in one of the databases 72. In this example, upon detecting that the vehicle 12 is no longer in operation, the telematics unit 14 obtains and sends vehicle data to the call center 24. The vehicle data includes the then-current status of one or more previously selected vehicle functions or conditions of the vehicle 12 (e.g., vehicle door locks, vehicle windows, interior lights, etc.) Upon receiving the vehicle data, the processor 78 at the call center 24, via an application including computer readable code, pulls up the checklist from the database 72 and runs through the checklist to determine if each of the vehicle functions and conditions meet the standards set forth in the checklist.

The checklist may include lines of items (which are each represented by computer readable code), where each item corresponds to a particular vehicle function or a particular vehicle condition. Each item also includes a standard representing a normal state of that vehicle function or condition (i.e., the state at which the vehicle function or condition has not been altered). For instance, a standard of the vehicle window opening/closing function may include all of the vehicle windows being closed when the vehicle 12 is not in operation. A standard of the vehicle door locking/unlocking function may include, for example, that all of the vehicle doors are locked when the vehicle 12 is not in operation.

The standard for each of the items in the checklist may be i) preset by the vehicle manufacturer, or ii) user-defined. In some instances, the standard for some of the items in the checklist may be preset by the manufacturer and the standard of the remaining items in the checklist may be user-defined. In instances where one or more of the items in the checklist include a respective standard that is preset by the vehicle manufacturer, the user may change one or more of the preset standards to a user-defined standard. The user may also change any user-defined standards to another user-defined standard. Changes to a standard may be accomplished, for example, by accessing the webpage 98 (e.g., by submitting an appropriate login and password) and selecting (via, e.g., a mouse click) an icon, menu option, or other link on the webpage 98 for updating the checklist. The updated checklist is then sent to the telematics unit 14 where it is stored in the memory 38, or the updated checklist is stored in the database 72 at the call center 24.

In instances where the checklist is stored in the memory 38 of the telematics unit 14, a standard in the checklist may be changed from inside the vehicle 12, e.g., by accessing the checklist through the telematics unit 14, which then presents the checklist on the display 80 inside the vehicle 12. The user may then verbally recite changes to one or more standards in the checklist into the microphone 28, and via speech recognition software, the processor 36 converts the recitation into text and then updates the checklist. The updated checklist is then stored in the memory 38. The checklist may also be updated via an in-vehicle display that is a touchscreen.

The checklist may otherwise be updated by placing a phone call to the call center 24, and reciting the changes to the call center advisor 62, 62'. The advisor 62, 62', who/that has access to the user's account, can update the checklist for the user. The updated checklist is stored in the database 72 and/or is sent to the telematics unit 14 from the call center 24 and stored in the memory 38.

Further, the checklist may be updated through the application $104_A$, $104_B$. In instances where the application $104_B$ is resident on the device 100, the user may access the checklist through the application $104_B$ and make any changes to the checklist. Once updated, the application $104_B$ may further include instructions for transmitting the updated checklist from the device 100 to the telematics unit 14, where the updated checklist is stored in the memory 38. The transmission of the updated checklist may be accomplished by establishing a packet data connection between the device 100 and the telematics unit 14, and then sending the updated checklist as packet data to the telematics unit 14.

In an example, the checklist may be updated using the application $104_A$ resident on the telematics unit 14 by accessing the checklist directly through the telematics unit 14.

When updating the checklist, the user may define a standard to fit the user's own preferences. For instance, the user may want at least one vehicle window to remain open while the vehicle 12 is not in operation. In another instance, the user may want some of the interior lights to remain on when the vehicle 12 is not in operation. The user may define a standard by changing the manufacturer set standard using any of the methods mentioned above for updating the checklist.

In an example of identifying the vehicle function, when the checklist is stored in the memory 38, the processor 36 runs through each line of code (i.e., each item) of the checklist (or updated checklist), and compares a then-current state of the vehicle system responsible for performing the vehicle function or condition corresponding to each item with the standard set forth in the checklist. This step may otherwise be performed by the processor 78 at the call center 24. The then-current state of the vehicle system may be obtained by the telematics unit 14 directly from the vehicle system by querying the vehicle system for a status update. A response to the query may be automatically sent to the telematics unit 14 from the vehicle system via the bus 34. In an example, if the vehicle function is a door locking/unlocking function, then the telematics unit 14 will request a status update from vehicle door locking system. The processor 36 will then compare the then-current status or state of the vehicle door locking system with the standard set forth in the checklist. The telematics unit 14 will otherwise send the then-current status of the vehicle system associated with the vehicle function or condition to the call center 24, and the processor 78 will compare the then-current status with the status in the checklist. If the then-current state of the vehicle door locking system does not match the standard, then the processor 36 (or the processor 78) will identify the vehicle door locking/unlocking function as a vehicle utility subject of the vehicle-related messaging method disclosed herein. On the other hand, if the then-current state of the vehicle door locking system matches the standard, then the processor 36 (or the processor 78) will move onto the next item in the checklist. It is to be understood that the processor 36 (or the processor 78) scans through the entire checklist and determines all of the vehicle functions or conditions that do not meet their respective standards. In an example, a separate message may be formulated for each of these vehicle functions or conditions, or all of these vehicle functions or conditions may be addressed in a single message. Further details of the message will be described below.

Identification of the vehicle utility will now be described for instances when the vehicle utility is personal item disposed inside the vehicle 12. Upon detecting that the vehicle 12 is no longer in operation, in one example, the telematics unit 14 automatically sends a signal to the in-vehicle camera(s) 82 with instructions to scan the vehicle interior. During the scan, the camera(s) 82 take images/video of the entire vehicle interior, and analyzes the images/video for the presence of any personal items therein. An example of this is semi-schematically shown in FIG. 4, which shows the camera(s) 82 taking images/video of the vehicle interior 83. One of the images/video will include an image/video of a briefcase 85 sitting on the passenger seat 87. During the analysis, any objects present in the images/video may be recognized by the processing unit associated with the camera(s) 82 by recognizing a characteristic of the objects. Examples of the characteristic include a geometric shape of the object and a size of the object. The geometric shape of the object may be a general shape (such as a square-shaped, rectangular-shaped, circular-shaped, etc.) or may be a shape that describes that of a specific object (such as the general shape of a briefcase, the general shape of a mobile phone, the general shape of an umbrella, etc.). The size of the object may be a generalized size, for example, the dimensions of a typical a laptop computer (e.g., about 18 inches in length and about 12 inches in width).

The analysis of the images/video may be accomplished, for example, by the processing unit associated with the camera(s) 82 by deciphering the shape and the size of the object (e.g., the briefcase 85 shown in FIG. 4) from the images/video. The processing unit then compares the deciphered shape and size of the object to a list of objects contained in a database. This list includes a number of different objects along with their specific shapes and measured sizes. An example database of objects may take the form of a look-up table containing a list of objects that are typically disposed or otherwise brought into a vehicle. Examples of objects include a coat, a briefcase, a cellular phone, books, compact discs, sunglasses, window/snow scraper, etc. The database may be set up by the vehicle manufacturer, by the user (e.g., using the webpage 98), and/or by the telematics service provider.

In another example, the characteristic of the object may have been learned by the processing unit of the in-vehicle camera(s) 82. This may have been accomplished, for example, by self-programming performed by the processing unit of the camera(s) 82. For instance, the processing unit may be programmed to recognize particular objects once those objects have previously been recognized by the processing unit, e.g., from analyzing images/videos previously taken by the camera(s) 82. The learned objects may then be added to the database of objects described above.

Another way that the processing unit of the camera(s) 82 can learn the characteristic(s) of an object includes pre-programming the processing unit to recognize specific objects. This may be accomplished, for example, by the user by accessing the webpage 98 and submitting a picture, photograph, or some other pictorial representation of the object. Characteristics of the object contained in the picture, photograph, etc. may be retrieved from the picture, photograph, etc. via suitable software programs run by a processor of the telematics service provider (e.g., the processor 78 at the call center 24). This information may be stored in the databases 72, as well as sent to the telematics unit 14 which forwards the information to the processing unit of the camera(s) 82. The processing unit may then add this information to the database of objects.

In another example, the camera(s) 82 can identify a personal item inside the vehicle 12 by watching vehicle contents brought into the vehicle 12 on a regular basis. The camera(s) 82 will notice new objects that are brought into the vehicle 12. If any of the new objects are subsequently left inside the vehicle 12 when such objects are normally not left inside the vehicle 12, the objects will be identified as a vehicle utility subject of a vehicle-related message for the user.

For the examples mentioned above, upon identifying the personal item from the images/video by the processing unit of the camera(s) 82, a signal containing the identification information is then sent to the telematics unit 14 from the camera(s) 82 via the bus 34.

In some instances, characteristic(s) of the object may be determined based on where the object is placed inside the vehicle 12. For instance, if the object is placed in a cup holder, then the processing unit of the camera(s) 82 may determine from the images/video taken during scanning of the vehicle interior 83 that the object is a beverage container. This information is sent from the camera(s) 82 to the telematics unit 14. In another example, the object may be connected to a universal serial bus (USB) connector specifically designed to be connected to an mp3 player. This information may be retrieved by the telematics unit 14 from the USB connection port, and in this example, the processor 36 identifies the object as being an mp3 player.

It is to be understood that the processor 36 can identify a personal item from a single identification source (e.g., from the images alone), or by multiple identification sources (e.g., from the images, from information obtained from the USB connection port, etc.).

As previously mentioned, the personal item may be a living being (e.g., a child, a dog, etc.). In such instances, characteristic(s) of the being may be recognized, by the telematics unit 14, from information obtained from one or more sensors 64 that are designed to detect movement inside the vehicle 12 (e.g., a motion sensor, a yaw rate sensor, or the like). One or more of this type of sensor may be placed on the dashboard, on the overhead console, on the rearview mirror, and/or anyplace where the sensor can adequately detect movement. The vehicle 12 may also include one or more sensors designed to detect the existence of the living being inside the vehicle 12 (e.g., a heartbeat sensor). The heartbeat sensor(s) may be positioned, e.g., inside the seats of the vehicle 12. Information from the motion sensors, heartbeat sensors, etc. may be sent to the telematics unit 14, via the bus 34, so that the telematics unit 14 can use the information (alone or in combination with information from images taken of the vehicle interior) to identify the living being who/that is inside the vehicle 12 when the vehicle 12 is no longer in operation.

The personal item may be a mobile communications device (e.g., a cellular phone, a smartphone, etc.). In these instances, when one or more vehicle-related events show that the vehicle 12 is no longer in operation and that the user has left the vehicle 12, a persistent wireless connection between the vehicle 12 and the phone may indicate that i) a phone has been left inside the vehicle 12 or ii) a person possessing the phone, as well as the phone itself have been left inside the vehicle 12.

In yet a further example, radio frequency identification (RFID) technology may be used to determine if any personal items have been left inside the vehicle 12. The vehicle 12 may include an RFID reader 84 operatively disposed therein (e.g., on the center console of the vehicle interior, as shown in FIG. 4). The RFID reader 84 generally utilizes radio waves to transfer data between a reader and an electronic tag (i.e., an RFID tag) attached to an object for the general purpose of identification and/or tracking. The RFID reader 84 contains hardware powered by the vehicle battery (e.g., if incorporated into the vehicle 12) or powered by its own battery (e.g., if separate from, but attached to the vehicle 12). Further, in this example, the RFID reader 84 is a fixed reader, where the reader has an interrogation zone (also referred to as a reading area or an RFID connection range) defined by a predefined radius or bubble surrounding the reader 84. The size of the interrogation zone is determined, at least in part, by its energy source, and thus by the amount of RFID energy generated by the reader 84. The interrogation zone may, for instance, include a distance ranging up to about 30 feet, or even at larger distances such as up to about 70 feet in any direction from the reader 84. The interrogation zone may, however, be adjusted to any suitable size within the range. For purposes of the present disclosure, it may be worthwhile to set the interrogation zone to a distance surrounding the vehicle, such as within 10 feet. This may be accomplished by adjusting the RFID energy of the reader 84. In an example, the RFID reader 84 may operate having an RFID energy of about 900 MHz.

The RFID reader 84 is configured to establish an RFID connection with the RFID tag 89 which may be disposed on the personal item (e.g., the tag 89 is shown attached to the briefcase 85 in FIG. 4). The RFID tag 89 may be composed of an integrated circuit for storing and processing information (such as information identifying the personal item), for modulating and demodulating the radio frequency (RF) signal, and for other specialized functions. The tag 89 further includes an antenna for receiving and transmitting the signal to the reader 84. As such, an RFID connection is established when the RFID reader 84 receives the signal from the RFID tag 89 when the tag 89 (which is attached to the personal item (e.g., 85 as shown in FIG. 4)) is placed within the RFID interrogation zone (i.e., within the RFID connection range or reading area). In an example, a personal item may be identified when the RFID reader 84 reads the RFID tag 89 disposed on the personal item, and obtains information identifying the personal item from the RFID tag 89.

It is to be understood that personal items disposed in the trunk area of the vehicle 12 may also be identified by the RFID reader 84, which can read an RFID tag 89 attached to the personal item inside the trunk.

It is also contemplated herein that the processor 36 is capable of executing software code for determining what personal items the user may need when the vehicle 12 is located at a particular destination. For instance, if the user is going to a concert, then the processor 36 may determine that the user needs his/her concert tickets. If the user is going to the beach, for instance, then the processor 36 may determine that the user needs his/her beach towel and sunscreen. Upon informing the telematics unit 14 of what the destination is (i.e., where the vehicle 12 will be going), the telematics unit 14 will look for those personal items associated with the destination. In an example, a personal item may be associated with a particular destination as a user-selected preference.

In yet another example, the user may have designated, as a user-preference, a particular location inside the vehicle 12 that is exempt from the method. Thus, the telematics unit 14 may identify a personal item disposed inside the designated location, but will not formulate and send a message pertaining to that personal item. The user may also designate a time limit that the exemption will apply, and then the exemption is null and void. For instance, messages pertaining to a personal item disposed in the designated location may not be formulated and sent for the first five vehicle trips. After the five trips, then the designated location is no longer exempt, and if the personal item is identified during the sixth trip, a message pertaining to the personal item will be formulated and sent to the user.

When a personal item is the vehicle utility, during step 302, all personal items left inside the vehicle 12 may be identified. The user may set, as a user preference, that all personal items left inside the vehicle 12 may be subject to a vehicle-related message (the formation of which will be described in detail below). The user may also select, as a user preference, that certain personal items that are identified may be subject to a vehicle-related message. In this way, the user's device will not be inundated with messages if, for instance, the user has a tendency to leave several personal items in his/her vehicle 12. The user may select, as a user preference, to not receive any messages pertaining to a personal item disposed inside the vehicle 12, but to receive messages pertaining to a vehicle function or condition. This may be useful, for example, if the user is traveling and has several personal items (e.g., luggage, books, CDs, clothing, etc.) disposed inside the vehicle 12.

Once the vehicle utility has been identified, at step 304, the method includes formulating a message pertaining to the identified vehicle utility. In an example, the message may be formulated by the processor 36 of the telematics unit 14 running suitable computer program code. The message may include a suggestion, a recommendation, an indication, or a notification for the user, and the suggestion, recommendation, indication, or notification pertains to the identified vehicle utility. Generally, the suggestion, if included in the message, is a presentation, to the user, of a concept or idea based on information learned by the telematics unit 14 about the identified vehicle utility. The information learned by the telematics unit 14 may include a then-current state of a particular vehicle function (e.g., that the driver side door is unlocked), or the presence of a personal item inside the vehicle 12 (e.g., that the briefcase 85 is sitting on the passenger seat 87 of the vehicle 12, as shown in FIG. 4). The concept or idea may be a proposed action that the telematics unit 14 can initiate as long as it has the user's authorization (which may be accomplished when the user selects an actionable item of the message, as described below). The suggestion may include a question, such as "The windows are closed. Do you want to open them?" The suggestion may otherwise take the form of a statement, such as "The windows are closed. Opening the windows would keep the vehicle cooler."

A recommendation, if included in the message, is a course of action that is advisable based on a then-current state of the identified vehicle utility. The recommendation is similar to the suggestion, but is generally presented in the form of advice rather than as a question or a statement including a proposed concept or idea. In an example, the recommendation may be something similar to "The windows are closed. It is advised to open the windows to keep the vehicle interior cooler."

The message may, in yet another example, include an indication. The indication is a notice to the user of a potential undesirable result associated with a then-current state of the identified vehicle utility. In an example, the indication may be formulated as a statement, such as "You left your computer inside the vehicle. It is hot outside, and increases in temperature of the vehicle interior may harm your computer."

In still another example, the message may include a notification. The notification is a statement informing the user of a then-current state of the identified vehicle utility, or a statement including pertinent information about the identified vehicle utility. Examples of a notification include "You left your computer inside the vehicle," "The driver's side window is open," etc.

The telematics unit 14 formulates the message to also contain at least one actionable item, and the actionable item (s) is/are associated with the suggestion, recommendation, indication, or notification contained in the message. As will be described in detail below, the user may select the actionable item (if only one actionable item is provided), or one of the actionable items (if a plurality of actionable items is provided) when the message is displayed on the device 100. Upon selecting an actionable item, the user provides authorization to the telematics unit 14 to initiate the action associated with the actionable item.

A variety of different combinations of actionable items may be contained in a single message. In one example, the message may contain i) a first actionable item that, when selected, performs the suggestion, recommendation, indication, or notification and ii) a second actionable item that, when selected, ignores the suggestion, recommendation, indication, or notification. In another example, the message contains either the first actionable item or the second actionable item, but not both. In yet a further example, the message may contain a third actionable item that, when selected, performs an alternative proposition to the suggestion, recommendation, indication, or notification. The third actionable item may be presented alone, in addition to the first actionable item, in addition to the second actionable item, or in addition to both the first and the second actionable items. As an example, if the telematics unit 14 identifies that the vehicle windows are closed, the processor 36 may formulate the message to include a suggestion similar to "Opening the windows would keep the vehicle cooler," and then formulate, e.g., two actionable items to accompany the suggestion. The two actionable items may include one actionable item to open windows, and another actionable item to leave the windows closed. The processor 36 may, in another example, include a third actionable item that is a proposed alternative action to the other two actionable items. The proposed alternative action may be, e.g., to open the windows slightly.

In an example, the actionable item(s) may include a selection to ignore a suggestion, recommendation, indication, or notification one time, and another selection to ignore the suggestion, recommendation, indication, or notification always. The first selection, when selected, ignores the suggestion, recommendation, indication, or notification once, but the suggestion, recommendation, indication, or notification may be presented to the user in another message at another time. The second selection, when selected, ignores the suggestion, recommendation, indication, or notification, and the processor 36 also automatically updates the software program with the user-selected preference to ignore any more suggestions, recommendations, indications, or notifications pertaining to that vehicle utility in the future. By this user-selected preference, the processor 36 will not formulate any more messages pertaining to that particular vehicle utility from here on out. The actionable items may also include a third selection to act (i.e., not ignore the suggestion, recommendation, the indication, or the notification), and to receive similar messages in the future.

When formulating the message, the processor 36 selects to formulate a suggestion, recommendation, indication, or notification pertaining to the identified vehicle utility. The processor 36 selects a suggestion, recommendation, indication, or notification utilizing default settings for a particular vehicle utility. For certain vehicle utilities, the default setting may direct the processor 36 to formulate the message to include a suggestion or a recommendation. For instance, if the user left the vehicle 12 with the windows open, the default setting may include an instruction to formulate a suggestion or recommendation to close the windows. For other vehicle utilities, the default settings may instruct the processor 36 to formulate a notification for the message. For instance, if the user left his/her briefcase in the vehicle 12, a notification to the user that the briefcase is in the vehicle 12 may be appropriate. For yet other vehicle utilities, the default settings may instruct the processor 36 to formulate an indication. For instance, if the user left the vehicle 12 with the headlights on, the message may include an indication that the vehicle battery may die if the headlights are left on beyond a certain period of time.

In some instances, the default settings may allow the processor 36 to select between the suggestion, recommendation, indication, or notification, or to select two or more suggestions, recommendations, indications, or notifications. The processor 36 may refer to the then-current status of the vehicle utility in order to make a selection. For instance, if the vehicle windows are closed, and the telematics unit 14 determines that the vehicle 12 was left in a cool spot (e.g., at 65° F. as determined from a temperature sensor), then the processor 36 may formulate the message to include a suggestion to close the windows. However, if the vehicle 12 was left in a hot spot (e.g., at 95° C. as determined from the temperature sensor), then the processor 36 may formulate the message to include an indication that the vehicle is too hot along with a suggestion to open the vehicle windows.

The processor 36 may also consider the then-current location of the vehicle 12 when formulating the message. For example, the telematics unit 14 retrieves the then-current vehicle GPS coordinate information from the GPS unit 44, and then formulates the message based on the location. The software program run by the processor 36 when formulating the message may contain computer program code that takes the then-current vehicle 12 location into account when selecting the suggestion, recommendation, indication, or notification for the message, as well as the actionable item(s) included in message. In other words, the software program may include code that recognizes certain geographic locations, and instructions for how the message is to be formulated based on those geographic locations. For example, a particular geographic location may be prone to rain storms. If the user left the vehicle windows open, and upon detecting that the vehicle 12 is then-currently located in that particular geographic area, the software program may include code for instructing the processor 36 to formulate the message to include an indication that the windows should be closed due to a high likelihood of rain, to include an actionable item for closing the windows, and/or the like. In another example, if a particular geographic location is, e.g., at an airport and the user left his/her plane tickets in the vehicle 12, the software program may then include code for instructing the processor 36 to formulate the message to include a notification that the user left the plane tickets inside the vehicle 12.

In another example, the vehicle 12 may be traveling in an area outside a predefined geographic boundary, which may have been predetermined by constructing a radius around the garage address of the vehicle 12 or some other user-selected position. A message may then be formulated when the vehicle 12 is outside of the geographic boundary (determined from the then-current GPS coordinate data of the vehicle 12), and this message may include a recommendation to "put the vehicle in vacation mode." The vacation mode may include adjusted settings of various vehicle systems that would otherwise not be set when the vehicle 12 is being used inside the geographic boundary. For instance, the user may leave the vehicle doors unlocked when using the vehicle 12 near his/her home, but may want the door locked when away from home. Locking the doors may be part of the vacation mode. The recommendation may be presented along with perhaps two actionable items; one to accept the vacation mode and another to decline the vacation mode.

The software program run by the processor 36 for formulating the message may be updated, by the user, with particular geographic location(s) that the program should take into account when formulating the message (e.g., when suggesting the vacation mode). These updates may be made, by the user, by accessing the webpage 98 and submitting the locations as a user-selected preference.

In an example, upon formulating the message, the processor 36 may ignore certain default settings based on other user-selected preferences. As mentioned above, the user-selected preferences may be set by the user, e.g., upon accessing the webpage 98 and submitting his/her preferred settings. These preferences (i.e., preferred settings) may include the user's preferences for how a message is to be formulated, when a message is to be formulated/not formulated, etc. For instance, the user may prefer that messages always contain an actionable item to accept a suggestion, recommendation, indication, or notification. The user may prefer, in another example, to never include an actionable item containing an alternative proposition to a suggestion, recommendation, indication, or notification. In some instances, the user may select, as a preference, certain vehicle utilities for which a message is to be formulated, and certain vehicle utilities for which a message is not to be formulated. For example, the user may select as a preference to never send a message when the user left the vehicle windows open. In another example, the user may select as a preference to always send a message whenever the vehicle doors are unlocked. In yet a further example, the user may select to always receive a notification whenever the vehicle 12 is located in a particular geographic location, such as a major city like Chicago, New York, Detroit, Dallas, or the like. These user-selected preferences are incorporated into the software program as a rule, and the updated program (i.e., the software program including the rule) is sent to, and stored in the telematics unit 14. It is to be understood that newly updated software programs are sent to the telematics unit 14 each time the user adds, deletes, or changes a user-selected preference.

Once the message has been formulated, the method moves to step 306 where the message is transmitted from the telematics unit 14 of the vehicle 12 to the user's mobile device 100. Transmission of this message occurs automatically as soon as the message is formulated. Further, the message may be transmitted using some type of long-range transmission connection (e.g., greater than 10 meters or 33 feet), examples of which include packet data connections or text messaging. In instances where the user's device 100 is within short range wireless connectivity range (e.g., within 10 meters or 33 feet), then transmission of the message may occur using a short range wireless connection between the device 100 and the telematics unit 14.

Upon receiving the message from the telematics unit 14, the application $104_B$ resident on the device 100 includes computer readable code for presenting the message on the device 100. Presentation of the message on the device 100 occurs at step 308 in FIG. 3. In the example shown in FIG. 5, the message (identified by reference numeral 120) appears on the touchscreen interface 112 of the user's mobile device 100. In this example, the message 120 was formulated upon identifying, by the telematics unit 14, that the vehicle windows were closed when the telematics unit 14 detected that the vehicle 12 is no longer in operation. The message 120 includes a recommendation 122 stating, e.g., that "opening the windows slightly would keep the vehicle cool." The message 120 further includes three actionable items; a first actionable item $124_A$ to open the windows slightly, a second actionable item $124_B$ to ignore the recommendation this time, and a third actionable item $124_C$ to ignore the recommendation always.

The application $104_B$ may be configured to arrange the message in a particular way, such as by positioning the suggestion, recommendation, indication, or notification 122 near the top of the message (relative to the top of the device 100), and the actionable item(s) $124_A$, $124_B$, $124_C$ underneath the suggestion, recommendation, indication, or notification 122. The message 120 may also include pictures or other graphics to give the message an aesthetic appearance. The pictures/graphics may be set by the manufacturer, or selected by the user as a preference. Further, the actionable items $124_A$, $124_B$, $124_C$ may be presented in any desirable format. For instance, an actionable item to ignore always (e.g., $124_C$) may be formatted as a phrase (e.g., "Ignore always"). In instances where one of the actionable items is to ignore the suggestion (with no indication to do so this time or always), then the item may be formatted as a word (e.g., "IGNORE"), as a letter (e.g., "N"), or even as a picture or icon indicating to ignore the suggestion (e.g., a thumbs down symbol, a stop sign, etc.). Colors may also be used for the actionable item, e.g., the color red to ignore a suggestion and the color green to accept a suggestion. The format of the actionable items may be preset by the application provider, or may be user-selected (e.g., upon accessing the application $104_B$ directly on the user's device 100 to make the selections).

When the message is presented on the device 100, the user may select one of the actionable items $124_A$, $124_B$, $124_C$, e.g., by touching the item using the touchscreen interface 112. An actionable item $124_A$, $124_B$, $124_C$ may otherwise be selected by verbally, e.g., by selecting the microphone icon on the touchscreen 112, and then reciting the selected item into a microphone (not shown) on the device 100. Still further, an actionable item $124_A$, $124_B$, $124_C$ may be selected by inputting an identifier (e.g., a letter or number) associated with the actionable item $124_A$, $124_B$, 124.

Upon making a selection, the device 100 sends a return message to the telematics unit 14 that includes the user's selection. The return message is sent using the same packet data connection, short range wireless connection, etc. utilized to send the original message 120. The return message contains a command to perform the user selected item $124_A$, $124_B$, $124_C$, and the return message is processed by the processor 36. Once an action that requires vehicle action is processed, the telematics unit 14 sends a signal, via the bus 34, to the appropriate vehicle system(s) to perform the action(s) associated with the user's selected item $124_A$, $124_B$, $124_C$. For instance, if the user selected the actionable item $124_A$ to open the vehicle windows slightly, then the telematics unit 14 sends a signal to the vehicle window system with an instruction to open the windows slightly.

In some cases, a single actionable item may include two functions. For instance, if the message contained a notification that the vehicle windows are open, then the actionable item may include a command to i) close the windows, and ii) turn on vehicle heating system. To perform this selection, upon receiving the return message, the telematics unit 14 will send signals to both the vehicle window system and the vehicle heating or HVAC system. It is to be understood that the telematics unit 14 may recruit as many vehicle systems as necessary in order to perform the user's selected action.

In instances where the user does not select any of the actionable items $124_A$, $124_B$, $124_C$, such as if the user was away from his/her device 100 when the message 120 was sent, then no return message is sent and the telematics unit 14 does not initiate any actions inside the vehicle 12. In an example, the application $104_B$ resident on the device 100 may include computer program code for timing out the message 120 after a period of no response by the user. For example, upon displaying the message 120 on the device 100, the message 120 may remain displayed for a period of time, e.g., of five minutes or the some other pre-programmed time period. After no response by the user during those five minutes, for example, the message 120 will disappear from the touchscreen 112 of the device 100. In an example, the application $104_B$ may be configured with computer readable code for re-displaying the message 120 e.g., upon receiving a signal to re-display the message 120 from the telematics unit 14. The message 120 may otherwise be re-displayed periodically (e.g., every five minutes, every ten minutes, etc.) for a set number of times (e.g., one more time, two more times, etc.). For instance, when the message 120 is displayed for the first time and no response is received, then the message 120 will disappear for a period of, e.g., five minutes before re-appearing on the user's device 100. If the application 104$_B$ is programmed to display the message 120 three times, then after five more minutes, the message 120 will disappear again when the user does nothing. The message will then re-appear again after another five minutes has passed. When the message 120 re-appears for the last time, the message 120 will either remain displayed until the user i) selects an action or ii) closes out the message 120 (e.g., by selecting a close icon such as an "x" at the top right hand corner of the screen).

It is to be understood that the parameters for re-displaying the message 120 on the device 100 after no response by the user may be preset by the application provider, or may be user-selected. The user may select the parameters by accessing the application 104$_B$ directly on his/her mobile device 100, and selecting and/or changing the parameters. Parameters may otherwise be selected and/or changed using the webpage 98. A notification may then be sent to the device 100 that an updated version of the application is available for download. In some cases, the application may be designed so that a re-download of the entire application including the updates would not be required, for example, where one or more bits of the application may be flipped for updated bits. For example, the user may select to have message 120 redisplayed five times as opposed to a default setting of three, may select to wait 10 minutes before re-displaying the message 120 as opposed to a default setting of five minutes, etc. The user may also select to disable the re-displaying function of the application 104. In this case, the message 120 will not be redisplayed after the message 120 has timed out the first time it was displayed due to no response by the user. Upon making the selections/changes, the application 104$_B$ is automatically updated. It is to be understood that the selections/changes will remain in effect until the user makes further selections/changes.

In another example, the message 120 may contain a single actionable action to ignore the suggestion (not shown). This actionable item may recite something similar to "Leave the windows closed." Upon selecting the actionable item, a signal is sent back to the telematics unit 14 from the device 100 with an instruction to do nothing. At the same time, the application 104$_B$ resident on the device 100 automatically closes out the message 120 and will not display this particular message 120 again. It is to be understood that if the situation arises where the vehicle windows are closed at another time when the vehicle 12 is detected to no longer be in operation, the same message 120 may be formulated, sent, and presented on the device 100.

Thus far, the example of the vehicle-related messaging method of FIG. 3 has been described where the application 104$_B$ resident on the mobile communications device 100 is responsible for presenting the vehicle-related message on the device 100. The application 104$_A$ resident on the telematics unit 14 performs the identifying of the vehicle utility and the formulating of the message on its own before sending the message to the device 100. Another implementation of the method of FIG. 3 will now be described herein following the dotted arrows in the flow diagram.

Referring back to step 300, upon detecting that the vehicle 12 is no longer in operation, the method moves to step 310 where the telematics unit 14 sends packet data to the device 100 that includes a notification that the vehicle 12 is no longer in operation. Upon receiving the packet data, the application 104$_B$ takes over. At step 312, via the application 104$_B$, the device 100 sends a request to the telematics unit 14 to identify a vehicle utility. The application 104$_A$ on the telematics unit 14 then performs one or more of the various process(es) described above for identifying the vehicle utility.

Once the telematics unit 14 has identified the vehicle utility, the telematics unit 14 sends other packet data to the device 100 including the identified vehicle utility. This occurs at step 314. Upon receiving this other packet data, the application 104$_B$ may send another request to the telematics unit 14 to formulate a message (shown at step 318) or the application 104$_E$ may formulate the message itself (shown at step 316). In the latter case (i.e., step 316), the application 104$_B$ will formulate the message utilizing the process(es) described above for step 304. It is to be understood that the application 104$_B$ is configured to pull additional information as necessary from other devices (e.g., 14, 78, etc.) when formulating the message, such as when applying user-selected preferences, etc. At step 316, the device 100 also presents the message on the device 100 for the user.

In instances where the device 100 sends another request to the telematics unit 14 to formulate the message, at step 318, the method moves to step 304 where the telematics unit 14 formulates the message. This example of the method then moves to step 306 where the message is transmitted from the telematics unit 14 to the device 100, and step 308 where the device 100 presents the message on the device 100 as previously described.

Referring back to step 300 of FIG. 3, after the telematics unit 14 has detected that the vehicle 12 is no longer in operation, the method may also include steps 320 through 324, which involve posting another message onto the user's networking webpage 94. Details of steps 320 through 324 are describe hereinbelow.

At step 320, the method includes obtaining then-current geographic location data of the vehicle 12 from the vehicle location detection unit 44. In an example, the geographic location data, which is in the form of longitudinal and latitudinal coordinates, is retrieved by the telematics unit 14 and sent to the host server 92 upon which the user's networking page 94 resides. The host server 92 may include a processing unit that utilizes computer software programs to convert the geographic location data into an actual then-current geographic location of the vehicle 12. The geographic location data may otherwise be converted into an actual geographic location by software code run by the processor 36. Examples of actual geographic locations may include an address (e.g., 123 Main Street), an intersection, a landmark reference (e.g., City Hall), and/or the like.

Once the then-current location of the vehicle 12 is determined, at step 322, the method includes formulating another message that includes the then-current location of the vehicle 12. This other message may be a text-based message, and is formulated in a format suitable for posting the message onto the user's networking page 94. One formulated, the message is posted on the user's webpage 94 at step 324. The message, when posted, may be used to apprise "friends" of the user's networking page 94 of where the user is at that moment in time. The message may also be used to apprise the user's "friends" that the user has arrived at a particular destination, e.g., if the user was planning a trip or the like.

It is to be understood that the example of the method including steps 320 through 324 may be performed automatically, or may be performed when authorized to do so by the user. Authorization may be obtained by sending a note to the user's device 100 from the telematics unit 14 asking the user if he/she would like to have his/her networking page 94 updated with the other message. The user can respond to the note by selecting either a yes function or a no function associated with the note. If the user responds with yes, then the method of steps 320 through 324 is performed. The method at steps 320 through 324 is not performed if the user responds with a no. If the user does not respond, then the method at steps 320 through 324 also is not performed.

Some examples of the vehicle-related messaging method have been described above. It is to be understood that any of these examples may be modified so that one or more steps of the method can be performed in a cloud. This method will be described herein in conjunction with FIG. 7, which utilizes the system 10' shown in FIG. 6.

Figure 6:
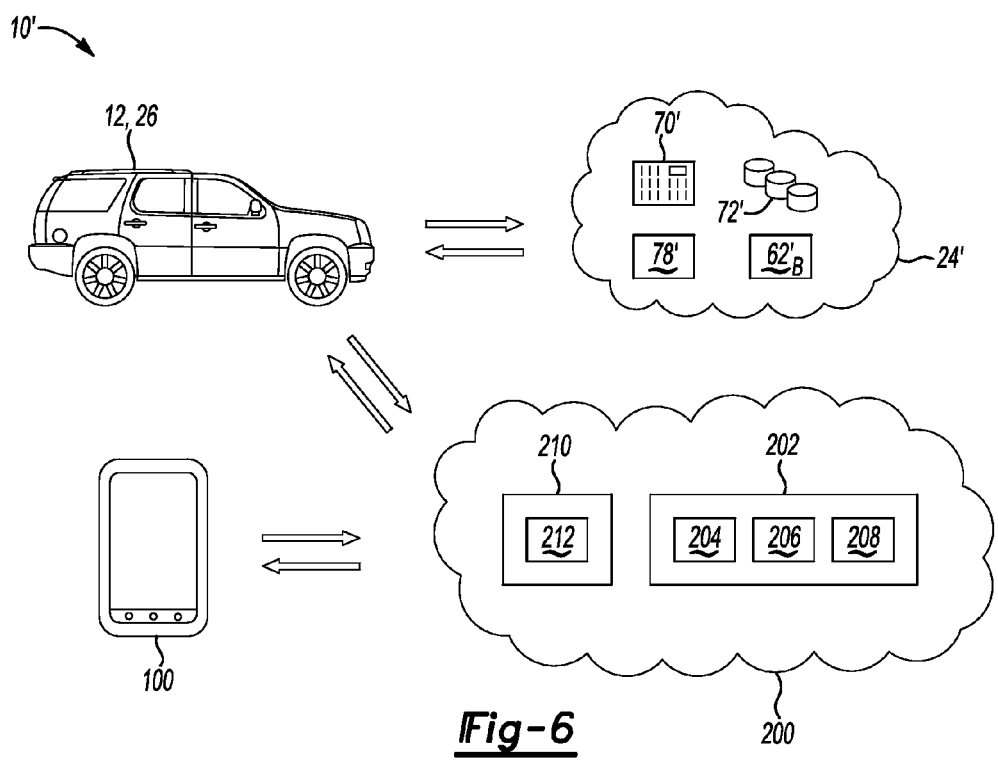
FIG. 6 is a schematic diagram depicting another example of a vehicle-related messaging system.

Referring now to FIG. 6, the system 10' includes the vehicle 12 and all of the vehicle hardware components 26 including the telematics unit 14 as previously described for the system 10 of FIG. 1. The system 10' further includes a call center 24', which serves the same purpose(s) as described above for the call center 24 of the system 10. However, in this example, the call center 24' components are configured as a cloud computing system (or the cloud 24'). The cloud 24' is an Internet- or world-wide-web computing environment that includes multiple pieces of hardware (physical and/or virtual) operatively coupled over a network so that they can perform specific computing tasks of the call center. For example, the cloud 24' may include computer equipment 74' that is accessible as a cloud platform service, or PaaS (Platform as a Service), utilizing cloud infrastructure rather than hosting computer equipment 74 at the call center 24 as shown in FIG. 1. The database 72' and server 70' may also be configured as a cloud resource. The cloud infrastructure, known as IaaS (Infrastructure as a Service) utilizes a platform environment as a service, which includes the processor 78', database 72', server 70', and computer equipment 74'. In an example, application software and services (such as, e.g., navigation route generation and subsequent delivery to the vehicle 12) may be performed in the cloud 24' via the SaaS (Software as a Service). Subscribers, in this fashion, may access software applications remotely via the cloud 24'. Further, subscriber service requests may be acted upon by an automated advisor $62_B'$, which may be configured as a service present in the cloud 24'.

It is to be understood that the call center 24 of the system 10 shown in FIG. 1 may also be configured as a cloud computing system, such as the call center 24' shown in FIG. 6.

The system 10' further includes a cloud 200 that is accessible by the vehicle 12 (via the telematics unit as one the vehicle hardware components 26) via the Internet or the world-wide-web, as well as by the mobile communications device 100. The cloud 200 is also in selective communication with the vehicle 12 and with the device 100. The cloud 200 includes multiple pieces of hardware (physical and/or virtual) operatively coupled over a network so that they can perform specific computing tasks, such as tasks related to the example methods disclosed herein. In this example, the cloud 200 includes physical hardware 202, such as processors 204, memory devices 206, and networking equipment 208. The processors 204 may be configured to run software 210, which in this example system includes an application 212 for formulating a vehicle-related message upon receiving information from the vehicle 12 that the vehicle 12 is no longer in operation, and then for transmitting the message to the user's device 100. The memory devices 206, for example, may be configured to store information, such as user preferences pertaining to how vehicle-related messages are to be formulated, the checklist of standards for vehicle functions, conditions, etc.

Figure 7:
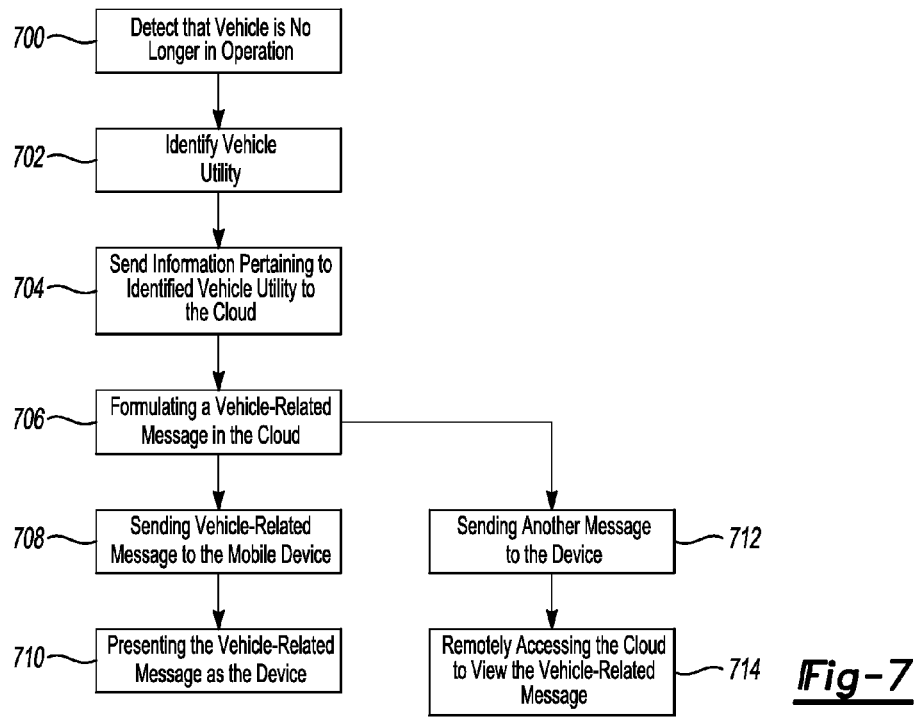
FIG. 7 is a flow diagram depicting another example of a vehicle-related messaging method utilizing the system of FIG. 6.

Referring now to the example method shown in FIG. 7, at step 700, the method involves detecting that the vehicle 12 is no longer in operation. Step 700 may be accomplished by the telematics unit 14 as previously described for step 300 of the examples of the method described in relation to FIG. 3.

Upon detecting that the vehicle 12 is no longer in operation, at step 702, a vehicle utility is identified. In instances where the vehicle utility is a personal item disposed inside the vehicle 12, the personal item may be identified by the telematics unit 14 using any of the methods previously described for step 302 of FIG. 3. When the vehicle utility is a vehicle function or a vehicle condition, then the function or condition may again be identified by the processor 36 of the telematics unit 14 as also described above. If so, the telematics unit 14 sends a packet of information pertaining to the identified vehicle utility to the cloud 200 where such information is processed by one of the processors 204. This occurs at step 704. The vehicle function or utility may otherwise be identified by the processor 78 at the call center 24 as also described above. In this case, the call center 24 (via the processor 78 having Internet access) sends information pertaining to the identified vehicle function or condition to the cloud 200 via the Internet.

At step 706, a vehicle-related message that includes a suggestion, recommendation, indication, or notification pertaining to the identified vehicle utility, alone with one or more actionable items, is formulated in by the processor 204 in the cloud 200. In this example, the processor 204 may retrieve user-selected information from one of the memory devices 206, such as user-preferences for how the message is to be formulated. The processor 204 may also take additional information into account when formulating the message. The additional information may include, for example, then-current weather conditions retrieved, e.g., from the national weather service, then-current traffic conditions retrieved, e.g., from the local traffic authorities, etc. Thus, in the cloud 200, the message may be formulated using information beyond that which was or could be generated by the vehicle 12.

At step 708, the message is sent from the cloud 200 to the mobile device 100. The transmission of the message from the cloud 200 may be accomplished using a packet (e.g., when sending to an application on the device 100) or an SMS (e.g., when sending to a device 100' capable of short-code text interaction). The cloud 200 may utilize available methods on cellular networks. For example, transport protocol (e.g., packet or SMS) could be sent over a cellular network. WiFi could also be used to send a packet. The message is then presented on the mobile device 100 at step 710.

Referring back to step 706, upon formulating the message in the cloud 200, the message may be stored in a memory device 206 which may be remotely accessed by the user. At step 712, via the networking equipment 208, another message is sent to the device 100 from the cloud 200. This message is a notification that a message is waiting for the user. Using the device 100 as an Internet browser, the user can access the cloud 200 and view the message that is stored in the memory device 206. This step is shown at 714 in FIG. 7.

Yet another example of the vehicle-related messaging method will be described hereinbelow with reference to FIGS. 8-10. This example method may be used in instances where the user's mobile communications device is not configured to run apps thereon, and such a device 100' is shown in, and is described hereinbelow in conjunction with FIG. 8.

Figure 8:
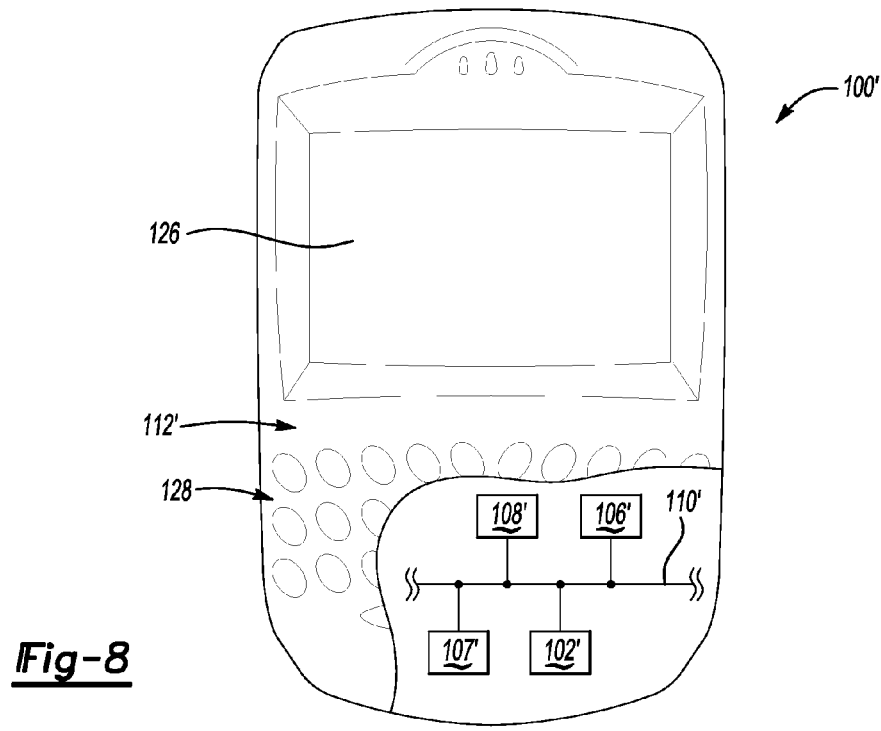
FIG. 8 semi-schematically depicts another example of a mobile communications device.

As shown in FIG. 8, the mobile device 100' is a cellular phone having a user interface 112' that includes a display screen 126 upon which information (e.g., a vehicle-related message) may be presented, and a keypad 128. In an example, the user may press appropriate keys of the keypad 128 upon formulating a reply message that includes a selection of an actionable item contained in the vehicle-related message. The device 100' may also include some electrical components, all of which are operatively connected to microprocessor 102' via an information bus 110'. These electrical components include a short range wireless connection unit 106', a cellular chipset 107', and a location detection unit 108', all of which are similar to the same components described above for the device 100 described above in conjunction with FIG. 2.

Further, since the device 100' is not designed to run apps thereon, the application 104$_B$ is not resident on the device 100'. Thus, the message to be sent to the device 100' (as will be described below in conjunction with the method of FIG. 9), is specifically formulated as a text message so that the message may be presented on the device 100'. The text message may be a short message service (SMS) message or a multi-message service (MMS) message. Thus, the device 100' may be selected from a mobile communications device capable of receiving and sending text messages, such as a cellular phone. It is to be understood, however, that the method shown in FIG. 9 may also be implemented for mobile communications devices that are capable of running apps thereon, but are also capable of sending and receiving text messages.

Figure 9:
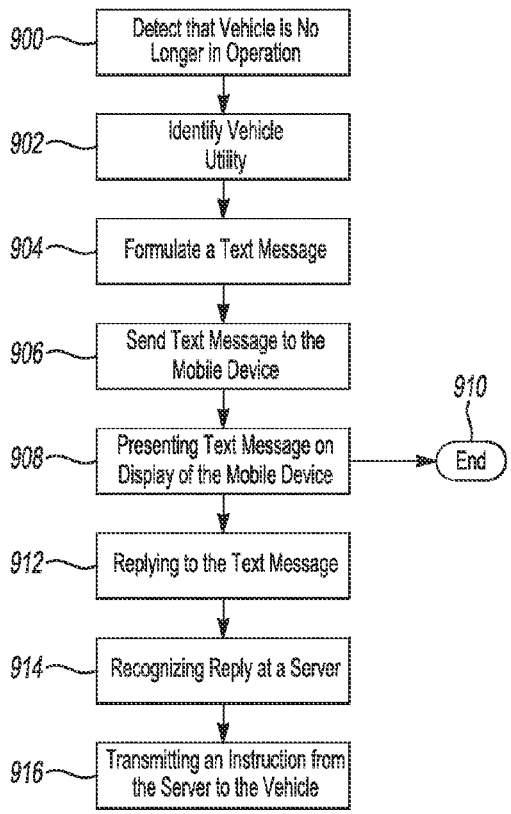
FIG. 9 is a flow diagram depicting yet another example of a vehicle-related messaging method.
Figure 10:
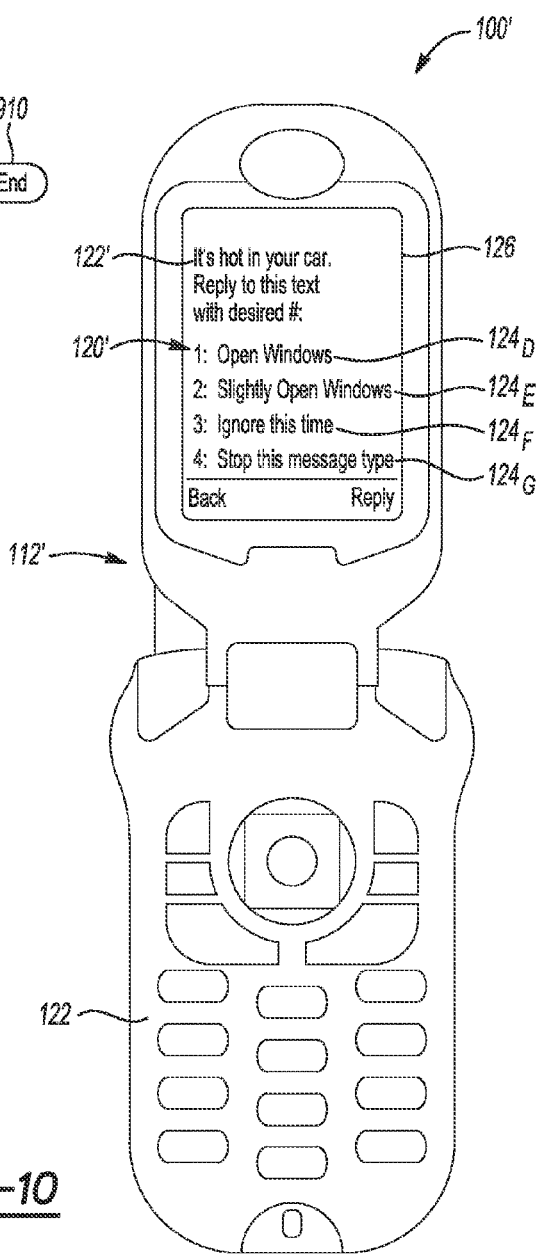
FIG. 10 semi-schematically depicts the example of the mobile communications device of FIG. 8 having an example of a vehicle-related message presented thereon.

Referring now to FIG. 9, at step 900, the method involves detecting that the vehicle 12 is no longer in operation, and then at step 902, identifying a vehicle utility. Steps 900 and 902 may be accomplished by any of the examples described hereinabove associated with steps 300 and 302 of FIG. 3, respectively. At step 904, the method involves formulating a text message (such as an SMS message or an MMS message) by the processor 36, and then sending the text message from the telematics unit 14 of the vehicle 12 to the mobile device 100' at step 906. As shown in FIG. 10, the text message 120' is presented to the user on display 126 (which is part of the user interface 112'), as shown at step 908 in FIG. 9. This message 120' includes a suggestion, recommendation, indication, or notification 122' and four actionable items 124, 124$_E$, 124$_F$, and 124$_G$. In the example shown in FIG. 10, the text message 122' includes a notification that "it's hot in your car", and the four actionable items include an action to "open windows" 124, an action to "slightly open windows" 124$_E$, an action to "ignore this time" 124$_F$, and an action to "stop this msg type" 124$_G$.

In some instances, the user may not respond to the text message 122' at all. If this occurs, then the method ends at step 910.

A user may be away from his/her phone and may not immediately receive the text message 122'. In some instances, the window for responding to the text message 122' may be i) unlimited, ii) time-limited (e.g., after a set time, the message 122' cannot be responded to), iii) event-limited (e.g., after a particular event occurs, next ignition on, next wrap-out from the vehicle 12, etc.), or a combination of ii and iii, where the time or event happening first dictates the ability to respond to the text message 122'.

The user may, on the other hand, reply to the text message 120', and this is shown at step 912. In an example, the message 120' may include instructions for how the user may select an actionable item 124$_D$, 124$_E$, 124$_F$, 124$_G$. In the example shown in FIG. 10, the message 120' includes an instruction that an actionable item 124$_D$, 124$_E$, 124$_F$, 124$_G$ may be selected by submitting a reply message that includes the numerical digit associated with the actionable item. The may be accomplished by typing the numerical digit, e.g., "1" which corresponds with the actionable item 124$_D$, using the keypad 128 of the device 100'. By pressing the "REPLY" button on the device 100', for example, the user types the number "1" to select the actionable item 124$_D$ if the user wants to open the windows. The user presses the "SEND" button on the device 100' to send the reply. The reply message is sent via the cellular towers 18 of the mobile communications provider (e.g., VERIZON®, SPRINT®, etc.) to a server of the telematics service provider. The server (not shown) includes processing equipment configured to run software programs that recognizes the reply message as being a reply to the vehicle-related message 120'. This occurs at step 914. The telematics service provider server recognizes the reply message using an association between the vehicle 12 and the mobile communications device 100'. For example, the vehicle 12 may be registered with the phone number of the device 100', and thus the server knows that messages coming from that vehicle 12 drive communications with the phone number. When the telematics service provider server sees a reply from that phone number, it sends the action requests to that vehicle 12. In other words, upon recognizing the reply message, the processing equipment of the server, running further software programs, formulates another message which is transmitted from the server to the telematics unit 14. The other message includes an instruction for the telematics unit 14 to perform the action associated with the actionable item selected by the user. This step is shown at 916 in FIG. 9. Upon receiving the other message from the server, the telematics unit 14 performs the user-selected action in accordance with the instruction contained in the other message.

Figure 11:
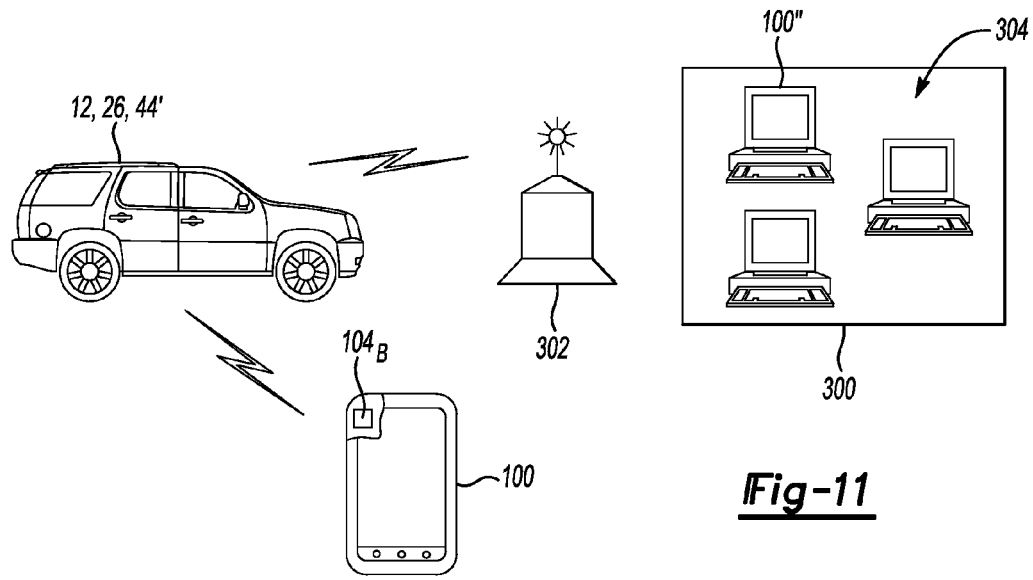
FIG. 11 is a schematic diagram depicting still another example of a vehicle-related messaging system.
Figure 12:
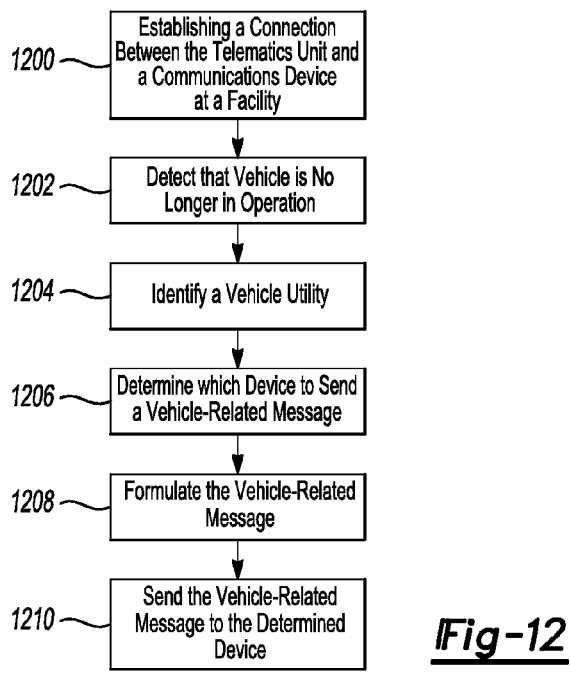
FIG. 12 is a flow diagram depicting an example of a vehicle-related messaging method utilizing the system of FIG. 11.

Another example of a vehicle-related message method will now be described herein in conjunction with FIG. 12, and this method utilizes the system 10" shown in FIG. 11. The system 10" generally includes the vehicle 12 and a facility 300 that is in selective communication with the vehicle 12. The facility 300 may be an establishment, organization, business, or the like that provides goods and/or services to customers (such as to the vehicle 12). Some examples of facilities 300 include vehicle service stations, dealerships, restaurants, stores, and/or the like. In an example, the facility 300 may also be a residence.

The vehicle 12 includes all of the vehicle hardware components 26 described above for the system 10, 10', including the telematics unit 14 and a short range wireless connection unit 44'. In this example, the short range wireless connection unit 44' can be used to establish BLUETOOTH® connections between the telematics unit 14 and another communications device, similar to the unit 44 of the systems 10, 10' described above. The unit 44', however, is further configured with Wi-Fi™ connectivity, and may be used to establish Wi-Fi™ connections between the telematics unit 14 and another communications device. The other communications may be, e.g., a communications unit 302 at the facility 300. In this example, the other communications unit 302 is a wireless access point (WAP), which allows wireless devices (e.g., the telematics unit 14) to connect to a wired network using Wi-Fi™. In still another example, the telematics unit 14 may connect with the unit 302 via BLUETOOTH® when the telematics unit 14 is within a wireless connection range of the unit 302 which has BLUETOOTH® capability.

The memory 38 of the telematics unit 14 may be configured to store an access point identifier (as referred to as a service set identifier (SSID)), which is a previously approved identifier that the vehicle 12 may be used to establish short range wireless connections with the unit 302. The unit 302 may include one or more directional antennas (not shown) that propagate a wireless signal at a predefined transmission power, and the vehicle 12 automatically connects with the unit 302 (via an appropriate SSID) when the vehicle 12 is within wireless connection range of the unit 302. In one example, the communications unit 302 is configured with Wi-Fi™ technology so that the telematics unit 14 can wirelessly connect with the unit 302. Further, the WAP (which may be known as a hotspot for Wi-Fi™ connections) may have a preset wireless access range for Wi-Fi™ connections, or may have a standard range of about 20 meters (i.e., about 65 feet) indoors, and a larger range outdoors. When the communications unit 302 is configured for BLUETOOTH® connections, the WAP may have a preset wireless access range, or may have a standard range of about 10 meters (i.e., about 33 feet).

In some cases, the memory 38 may contain a set of previously approved SSIDs that may enable the vehicle 12 to establish the wireless connections with respective WAPs 302 located at various facilities 300. For instance, three SSIDs may be stored in the memory 38; where one SSID provides the telematics unit 14 with access to a WAP 302 at store A on 12$^{th}$ Street, another SSID provides the telematics unit 14 with access to a WAP 302 at service station B on ABC Avenue, and yet another SSID provides the telematics unit 14 with access to the WAP 302 at restaurant C on Shady Lane. The access point identifiers may be pre-programmed into the telematics unit 14 (i.e., stored in the memory 38) at the time of manufacture, or by a dealership upon purchasing the vehicle 12. The access point identifiers may otherwise be programmed into the telematics unit 14 over the air (e.g., downloaded using component(s) of the carrier/communication system 16) at a later time.

While the access point identifier provides the telematics unit 14 with access to a particular unit 302, the telematics unit 14 may utilize a pre-shared wireless connection key to establish a short range wireless connection with the unit 302/WAP. The wireless connection key may be a security code of the telematics unit 14 that is generated during pairing (e.g., BLUETOOTH® pairing) of the telematics unit 14 and the unit 302. The key may also be used by the telematics unit 14 to establish its identity and authenticity for communications with the facility 300 at which the unit 302 is located. It is to be understood that the communications unit 302 also generates its own wireless connection key, and the devices 14, 302 are considered to be paired when the devices 14, 302 exchange their respective wireless connection keys. After an initial BLUETOOTH® pairing is made, it is to be understood authentication of the vehicle 12 may take place before any information is shared with the facility 300.

Referring back to the facility 300, the facility 300 further includes a local network 304 which may be a private wired network, such as an Intranet network. The local network 304 includes a network of computers that uses Internet Protocol (IP) technology to securely share any part of the facility's information or network operating system within the facility 300. Each of the computers is configured with suitable communications equipment enabling the computers to individually operate as a communications device. The computers in this example are identified by reference numeral 100'', and are referred to herein as communications devices 100''. In the example method described hereinbelow in reference to FIG. 12, a vehicle-related message formulated by the telematics unit 14 may be sent to, and presented on one or more of the devices 100'' at the facility 300. In an example, the message is presented on the device(s)/computer(s) 100'' via the application 104$_B$, which is resident on the device(s)/computer(s) 100''. In another example, the device(s)/computer(s) 100'' each are configured to access the Internet, and may individually operate as a browser enabling a person at the facility 300 to view the message from a cloud.

In an example, the system 10'' includes the user's mobile communications device 100 which may also have the application 104$_B$ resident thereon. The device 100 can receive a vehicle-related message from the telematics unit 14, and by the application 104$_B$, can present the message on the device 100. In instances where the device 100' is not configured to run apps thereon, the user's device 100' may receive a text message from the telematics unit 14 and present the message on the device 100'.

An example of the method utilizing the system 10'' will now be described in conjunction with FIG. 12. The method includes establishing a connection between the telematics unit 14 and the communications unit 302 at the facility 300. This step is shown at 1200. For instance, the communications unit 302 may automatically establish a point-to-point, short range wireless connection with the telematics unit 14 when the telematics unit 14 is within wireless connection range of the unit 302. The short range wireless connection may be established as a Wi-Fi™ connection or as a BLUETOOTH® connection.

It is to be understood that the connection is established between the vehicle 12 (by the telematics unit 14) and a user-selected facility (by the communications unit 302); i.e., a facility 300 that the user selects as being a recipient of a vehicle-related message according to the instant example method. In an example, the user may select a particular vehicle service station that the user takes his/her vehicle 12 to for servicing/maintenance. In another example, the user may select a type of facility, such as all department stores. The user may select the facilities 300, e.g., by calling the call center 24, and requesting an advisor 62$_A$ to select the facilities. The user may recite his/her selections to the advisor 62$_A$ during the phone call, and the advisor 62$_A$ (who has access to the user's account) stores the user-selected facilities in one of the databases 72. The user may also work his/her way through automated menu options when selecting the facilities during a phone call, as opposed to talking with a live advisor 62$_A$. The user may also select the facilities by accessing the webpage 98 (e.g., by submitting an appropriate login and password), and selecting and/or inputting his/her selections into the webpage 98. Yet another way of selecting the facilities include sending an electronic mailing (e-mail) message to the call center 24, where the e-mail message includes the user's selections. The call center 24 (via a software program run by the processor 78) extracts the user's selections from the e-mail message and stores the selections in the database 72.

It is to be understood that the user's selections are set until an authorized person (e.g., the user or another person with authorization) accesses the webpage 98 or contacts the call center 24, and removes or otherwise changes the user-selected facilities. The removed/changed selections will take effect as soon as they are stored in the database 72, and remain as active selections until the user's subscription with the telematics service provider expires or is canceled, or for a user-defined duration of time. Further, authorized persons are allowed to remove/change the selections, and those that are authorized are pre-established by the user who originally set up the account with the telematics service provider.

In instances where the connection is a Wi-Fi™ connection, the SSID used to establish the connection may, in some cases, be determined and potentially duplicated by others desiring to access the facility 300. As such, it may be desirable that the vehicle 12 be authenticated by the telematics service provider prior to allowing the vehicle 12 to fully utilize the Wi-Fi™ connection. Authentication may take place, for example, using an authentication certificate or via a program such as RADIUS.

Upon establishing the connection, at step 1202, the telematics unit 14 of the vehicle 12 detects that the vehicle 12 is no longer in operation. This scenario may arise when the user drops off his/her vehicle 12 at the facility 300; such as at a service station for servicing the vehicle 12. The user may have parked his/her vehicle 12 in the service station parking lot, and the user has physically left the vehicle 12. Then, at step 1204, a vehicle utility (e.g., a vehicle function, a vehicle condition, or a personal item disposed inside the vehicle 12) is identified by the telematics unit 14. The telematics unit 14 detects that the vehicle 12 is no longer in operation, and identifies a vehicle utility utilizing any of the example processes previously described in conjunction with the method of FIG. 3.

At step 1206, the telematics unit 14 determines which of the devices 100, 100', 100" to send a vehicle-related message to. In one example, the telematics unit 14 may be pre-programmed to automatically send a vehicle-related message to the facility 300 that the vehicle 12 is then-currently connected to. For instance, if the vehicle 12 connects with department store A, then the telematics unit 14 will send a vehicle-related message to department store A (i.e., to the device 100" of the department store A). In some instances, the telematics unit 14 may be pre-programmed to send a vehicle-related message to both the facility 300 (i.e., to the device 100") and the user's device 100, 100'.

In another example, the user may have designated a level of importance for each vehicle utility, thereby establishing a priority of messages as two or more vehicle utilities are identified by the telematics unit 14. The level of importance of each vehicle utility may have been designated by the user at the same time that the user selected the facilities 300. The user may have otherwise used the same process(es) used to select the facilities 300 to designate the level of importance of the vehicle utilities at later time. In an example, the user may have designated a higher level of importance for a briefcase left inside the vehicle than a vehicle window being open. The user may have also designated a higher level importance for a vehicle window being open than for a pair of gloves left inside the vehicle 12. Using the pre-established levels of importance, upon detecting that a briefcase was left inside the vehicle 12 and one of the vehicle windows is open, for example, the telematics unit 14 will formulate a message pertaining to the briefcase and send that message to the device 100" of the facility 300. Afterwards, the telematics unit 14 will formulate another message pertaining to the open vehicle window, and then send that message to the facility 300.

In an example, the user may select a desired recipient of the message based on the type of utility while applying the level of importance of the vehicle utility at the same time. For instance, the user may have selected to have all messages sent to the facility 300 in the order of their level of importance except for a message pertaining to a particular vehicle utility, e.g., the user's briefcase left inside the vehicle 12. In instances where the telematics unit 14 identifies the briefcase inside the vehicle 12, that the vehicle windows are open, and that the vehicle doors are unlocked, the telematics unit 14 will first formulate a message pertaining to the briefcase, and send that message to the user's device 100, 100'. Two other messages are also formulated in sequence; one for the vehicle windows and then another for the vehicle doors since the vehicle windows have a higher importance level than the vehicle doors. If, for example, the user left his/her vehicle 12 at a vehicle service station, the user will be automatically notified that he/she left the briefcase in the vehicle 12. Upon receiving this message, the user may be notified that the briefcase is there and may want to go back to the vehicle 12 to retrieve the briefcase. The service station will then receive messages that the vehicle windows are open and the doors are unlocked. By these messages, a serviceman who is in temporary possession of the vehicle 12 may be notified of these vehicle utilities and may close the windows and lock the doors of the vehicle 12 for the user.

Referring back to FIG. 12, upon determining which device to send the message to, at step 1208, the telematics unit 14 formulates the message(s) via the process(es) as previously described in the method of FIG. 3. At step 1210, the message is/are then sent to the appropriate device 100, 100', 100" that was/were determined in step 1206.

While several examples have been described in detail, it will be apparent to those skilled in the art that the disclosed examples may be modified. Therefore, the foregoing description is to be considered non-limiting.

The invention claimed is:

1. A vehicle-related messaging method, comprising:
   by a telematics unit operatively disposed in a vehicle, detecting that the vehicle is no longer in operation;
   upon detecting that the vehicle is no longer in operation, by the telematics unit, automatically transmitting a message to a device, the message including a suggestion, a recommendation, an indication, or a notification pertaining to a vehicle utility; and
   by an application resident on the device or on a cloud computing system in communication with the device, presenting the message on the device, the presenting including displaying i) the suggestion, the recommendation, the indication, or the notification and ii) a plurality of actionable items associated with the suggestion, the recommendation, the indication, or the notification, wherein the application is executable by a processor of the device or by a processor of the cloud computing system, and the application includes computer readable code, embedded on a non-transitory, tangible computer readable medium, for performing the presenting;
   wherein prior to transmitting the message to the device, the method further includes:
   identifying the vehicle utility, the identifying being accomplished by a processor operatively associated with the telematics unit, the processor operatively associated with the telematics unit executing computer readable code embedded on a non-transitory, tangible computer readable medium associated therewith; and
   one of:
      via the processor of the telematics unit, formulating the message pertaining to the identified vehicle utility; or
      upon receiving a note from the telematics unit including i) an indication that the vehicle is no longer in operation and ii) the identified vehicle utility, formulating the message, by the processor of the cloud computing system, pertaining to the identified vehicle utility;
   wherein the vehicle utility is a personal item disposed inside a vehicle interior, and wherein the identifying of the vehicle utility is accomplished by:
      recognizing a characteristic of an object inside the vehicle interior; and
      recognizing, by the processor of the telematics unit, the object as being the personal item based on the recognized characteristic of the object.

2. The vehicle-related messaging method as defined in claim 1 wherein the detecting that the vehicle is no longer in operation is accomplished by detecting any of: a vehicle ignition has been switched to an OFF state and a vehicle transmission system has been switched into park mode; a short range wireless connection has ended; an in-vehicle camera image has indicated a lack of persons inside the vehicle; a seat weight has changed to a null state; a seat belt sensor has indicated that a seat belt locking mechanism has been released; or combinations thereof.

3. The vehicle-related messaging method as defined in claim 1 wherein the recognizing of the characteristic is accomplished using an in-vehicle camera, a motion sensor, a heartbeat sensor, a short range wireless communications unit, or combinations thereof.

4. The vehicle-related messaging method as defined in claim 1 wherein the plurality of actionable items is chosen from: i) a first actionable item that, when selected, performs the suggestion, the recommendation, an action associated with the indication, or an action associated with the notification, ii) a second actionable item that, when selected, ignores the suggestion, the recommendation, the action associated with the indication, or the action associated with the notification, iii) a third actionable item that, when selected, performs an alternative proposition to the suggestion, the recommendation, the indication, or the notification, and iv) combinations of i), ii), and iii).

5. The vehicle-related messaging method as defined in claim 1, further comprising:
receiving, by one of the processor of the telematics unit or the processor of the cloud computing system, a user-selected setting; and
generating, by the processor of the telematics unit or the processor of the cloud computing system, a rule based on the user-selected setting for transmitting the message or for configuring the message.

6. The vehicle-related messaging method as defined in claim 1 wherein prior to automatically transmitting the message to the device, the method further comprises:
determining a then-current location of the vehicle; and
by a processor operatively associated with the telematics unit, formulating the message based on the then-current location of the vehicle.

7. The vehicle-related messaging method as defined in claim 1 wherein upon detecting that the vehicle is no longer in operation, the method further comprises:
obtaining then-current geographic location data from an in-vehicle location detection unit;
utilizing the then-current geographic location data to determine a then-current location of the vehicle;
formulating an other message that includes the then-current location of the vehicle; and
posting the other message on an online networking page.

8. The vehicle-related messaging method as defined in claim 1 wherein prior to detecting that the vehicle is no longer in operation, the method further comprises establishing a connection between the telematics unit and a communications unit at a facility.

9. The vehicle-related messaging method as defined in claim 8 wherein upon identifying the vehicle utility, the method further comprises, by a processor of the telematics unit, determining where to transmit the message, and wherein the transmitting of the message includes transmitting the message to i) a user-owned mobile communications device, ii) a facility-owned device, or iii) both i) and ii).

10. The vehicle-related messaging method as defined in claim 9 wherein the vehicle utility is a plurality of vehicle utilities, and wherein the determining of where to transmit the message is based on a user-selected priority of the plurality of vehicle utilities.

11. A vehicle-related messaging method, comprising:
by a telematics unit operatively disposed in a vehicle, detecting that the vehicle is no longer in operation;
upon detecting that the vehicle is no longer in operation, by a processor operatively associated with the telematics unit, formulating a text message including i) a suggestion, a recommendation, an indication, or a notification pertaining to a vehicle utility, and ii) a plurality of actionable items associated with the suggestion, the recommendation, the indication, or the notification, wherein the processor executes computer readable code for performing the formulating, and wherein the computer readable code is embedded on a tangible, non-transitory computer readable medium;
by the telematics unit, automatically transmitting the text message to a mobile communications device; and
presenting the text message on the mobile communications device;
wherein prior to formulating the text message, the method further includes:
identifying, by the processor, the vehicle utility;
wherein the vehicle utility is a personal item disposed inside a vehicle interior, and wherein the identifying of the vehicle utility is accomplished by:
recognizing a characteristic of an object inside the vehicle interior; and
recognizing, by the processor, the object as being the personal item based on the recognized characteristic of the object.

12. The vehicle-related messaging method as defined in claim 11 wherein upon presenting the text message on the mobile communications device, the method further comprises:
transmitting a reply to the text message to a server, the reply including a selection of one of the plurality of actionable items associated with the suggestion, the recommendation, the indication, or the notification;
recognizing the reply at the server; and
transmitting an instruction from the server to the telematics unit, the instruction corresponding to the selection of one of the plurality of actionable items included in the reply.

13. A vehicle-related messaging system, comprising:
a vehicle;
a telematics unit operatively disposed in the vehicle, the telematics unit including a processor executing computer readable code, embedded on a tangible, non-transitory computer readable medium, for detecting that the vehicle is no longer in operation;
a mobile communications device in selective and operative communication with the telematics unit via a short range wireless connection, the mobile communications device to receive a message from the telematics unit upon detecting that the vehicle is no longer in operation, the message including i) a suggestion, a recommendation, an indication, or a notification pertaining to a vehicle utility and ii) a plurality of actionable items associated with the suggestion, the recommendation, the indication, or the notification;
a user interface associated with the mobile communications device and usable to submit a reply to the message received from the telematics unit, the reply including a selection of one of the actionable items included in the message; and
at least one of a vehicle sensor, an in-vehicle camera, or a short range wireless communications unit to perform the detecting that the vehicle is no longer in operation;
wherein the vehicle utility is a personal item, and wherein the at least one of the vehicle sensor, the in-vehicle camera, or the short range wireless communications unit is configured to recognize an object disposed inside a vehicle interior, the object having a characteristic recognizable by the processor of the telematics unit as being the personal item.

14. The vehicle-related messaging system as defined in claim 13, further comprising:
   a processor operatively associated with the mobile communications device; and
   an application resident on the mobile communications device and executable by the processor, the application including computer readable code, embedded on a non-transitory, tangible computer readable medium for displaying i) the suggestion, the recommendation, the indication, or the notification and ii) the plurality of actionable items associated with the suggestion, the recommendation, the indication, or the notification.

15. The vehicle-related messaging system as defined in claim 13 wherein the message is a text message, and wherein the user interface is operatively connected to a display to present the text message on the mobile communications device.

16. The vehicle-related messaging system as defined in claim 13 wherein the processor operatively associated with the telematics unit further includes computer readable code for identifying the vehicle utility as the personal item.

17. The vehicle-related messaging system as defined in claim 13 wherein the at least one actionable item is chosen from: i) a first actionable item that, when selected, performs the suggestion, the recommendation, the indication, or the notification, ii) a second actionable item that, when selected, ignores the suggestion, the recommendation, the indication, or the notification, iii) a third actionable item that, when selected, performs an alternative proposition to the suggestion, the recommendation, the indication, or the notification, and iv) combinations of i), ii), and iii).

18. The vehicle-related messaging system as defined in claim 13, further comprising:
   a geographic location detection unit to determine a then-current geographic location of the vehicle; and
   an online networking page upon which an other message is to be posted, the other message including the then-current geographic location of the vehicle.

19. The vehicle-related messaging system as defined in claim 13, further comprising a webpage accessible by a user of the vehicle, the webpage being usable to update settings pertaining to how the message is to be formulated, when the message is to be formulated, and combinations thereof.

\* \* \* \* \*